United States Patent
Valentine et al.

(10) Patent No.: US 9,448,795 B2
(45) Date of Patent: Sep. 20, 2016

(54) LIMITED RANGE VECTOR MEMORY ACCESS INSTRUCTIONS, PROCESSORS, METHODS, AND SYSTEMS

(71) Applicant: Intel Corporation, Santa Clara, CA (US)

(72) Inventors: Robert Valentine, Kiryat Tivon (IL); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/969,249

(22) Filed: Dec. 15, 2015

(65) Prior Publication Data

US 2016/0170749 A1    Jun. 16, 2016

Related U.S. Application Data

(63) Continuation of application No. 13/838,544, filed on Mar. 15, 2013, now Pat. No. 9,244,684.

(51) Int. Cl.
| | |
|---|---|
| *G06F 9/38* | (2006.01) |
| *G06F 9/30* | (2006.01) |
| *G06F 9/355* | (2006.01) |
| *G06F 12/02* | (2006.01) |

(52) U.S. Cl.
CPC ........... *G06F 9/30036* (2013.01); *G06F 9/355* (2013.01); *G06F 9/3887* (2013.01); *G06F 12/023* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 2004/0250044 A1 | 12/2004 | Isomura et al. | |
| 2006/0005082 A1 | 1/2006 | Fossum et al. | |
| 2010/0318608 A1* | 12/2010 | Huang .................. | G06F 9/4856 709/205 |
| 2011/0138122 A1 | 6/2011 | Hughes et al. | |
| 2011/0138155 A1 | 6/2011 | Kawaguchi et al. | |
| 2012/0144089 A1 | 6/2012 | Hall et al. | |
| 2012/0151156 A1 | 6/2012 | Citron et al. | |

(Continued)

FOREIGN PATENT DOCUMENTS

| | | |
|---|---|---|
| CN | 102103483 A | 6/2011 |
| GB | 2461850 A | 1/2010 |

(Continued)

OTHER PUBLICATIONS

Office Action received for Korean Patent Application No. 10-2014-30543, mailed on May 20, 2015, 4 pages of English Translation and 5 page of Korean Office Action.

(Continued)

*Primary Examiner* — Scott Sun
(74) *Attorney, Agent, or Firm* — Vecchia Patent Agent, LLC

(57) ABSTRACT

A processor of an aspect includes a plurality of packed data registers. The processor also includes a unit coupled with the packed data registers. The unit is operable, in response to a limited range vector memory access instruction. The instruction is to indicate a source packed memory indices, which is to have a plurality of packed memory indices, which are to be selected from 8-bit memory indices and 16-bit memory indices. The unit is operable to access memory locations, in only a limited range of a memory, in response to the limited range vector memory access instruction. Other processors are disclosed, as are methods, systems, and instructions.

25 Claims, 25 Drawing Sheets

(56) References Cited

U.S. PATENT DOCUMENTS

| | | |
|---|---|---|
| 2012/0254591 A1 | 10/2012 | Hughes et al. |
| 2013/0054899 A1 | 2/2013 | Ginzburg et al. |
| 2013/0311530 A1* | 11/2013 | Lee .................. G06F 7/548 |
| | | 708/441 |
| 2013/0326160 A1 | 12/2013 | Sperber et al. |
| 2014/0006469 A1* | 1/2014 | Gueron .............. G06F 7/5324 |
| | | 708/620 |
| 2014/0095831 A1 | 4/2014 | Grochowski et al. |
| 2014/0149713 A1 | 5/2014 | Jha et al. |
| 2014/0164667 A1 | 6/2014 | Resnick et al. |
| 2014/0181464 A1 | 6/2014 | Forsyth et al. |
| 2014/0201498 A1 | 7/2014 | Ould-Ahmed-Vall et al. |

FOREIGN PATENT DOCUMENTS

| | | |
|---|---|---|
| JP | 06-044292 A | 2/1994 |
| JP | 09-062654 A | 3/1997 |
| JP | 09-231347 A | 9/1997 |
| JP | 2004-355597 A | 12/2004 |
| JP | 2008-505396 A | 2/2008 |
| JP | 2011-134318 A | 7/2011 |
| KR | 10-2003-0064807 A | 8/2003 |
| KR | 10-2004-0086529 A | 10/2004 |

OTHER PUBLICATIONS

Notice of Allowance received for U.S. Appl. No. 13/838,544, mailed on Sep. 16, 2015, 8 pages.

combined search and examination report received for United Kingdom Patent Application No. 14039762, mailed on Sep. 1, 2014, 5 pages.

Office Action received for Japanese Patent Application No. 2014-042958, mailed on Apr. 28, 2015, 3 pages of English Translation and 1 page of Japanese Office Action.

Office Action received for Chinese Patent Application No. 201410097314.8, mailed on Feb. 29, 2016, 8 pages of Chinese Office Action.

\* cited by examiner

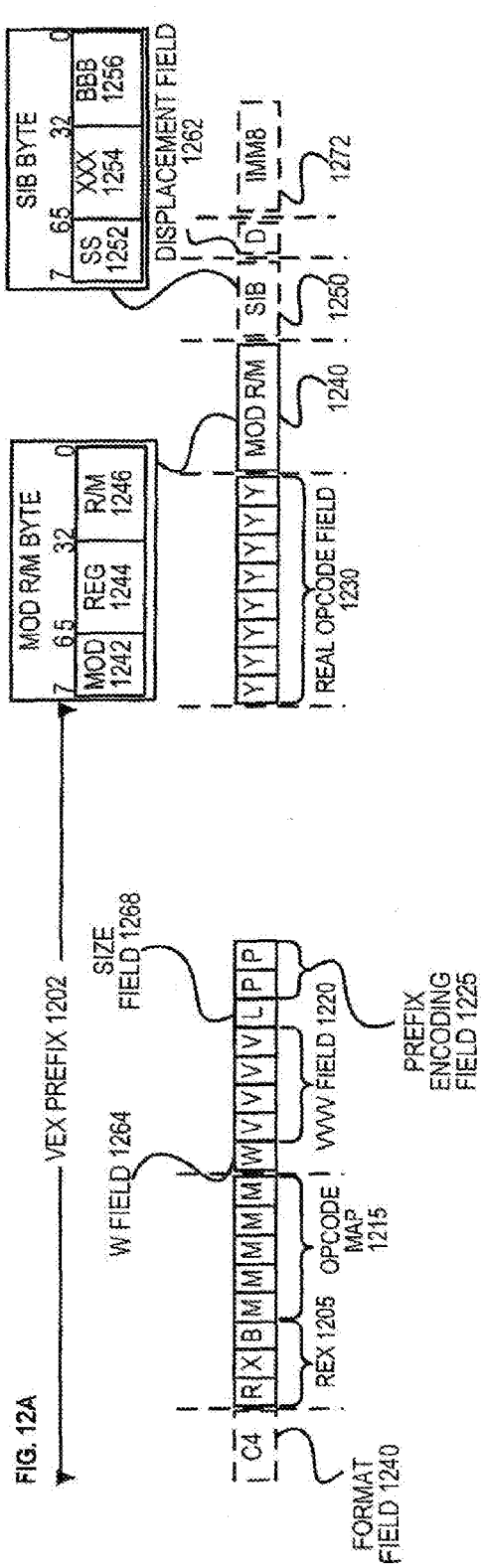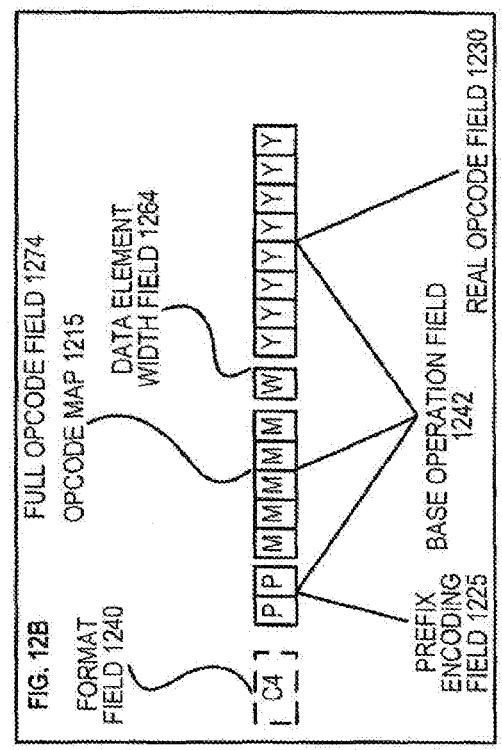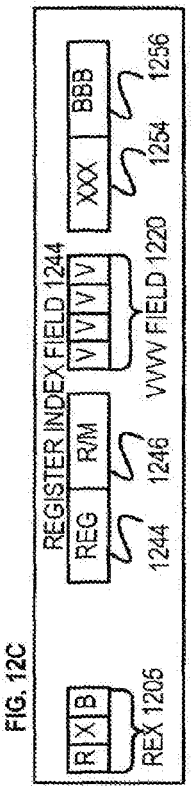

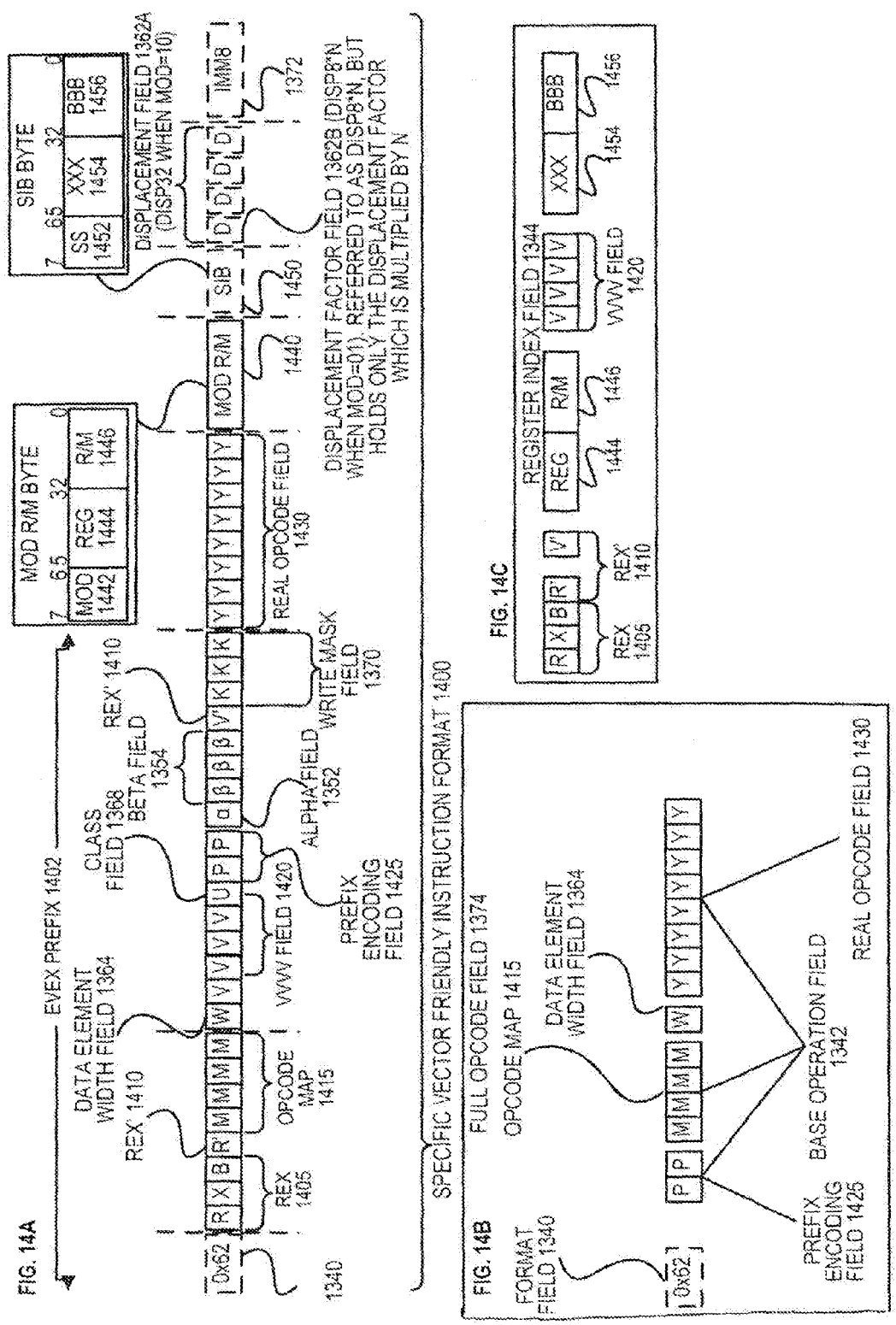

FIG. 15
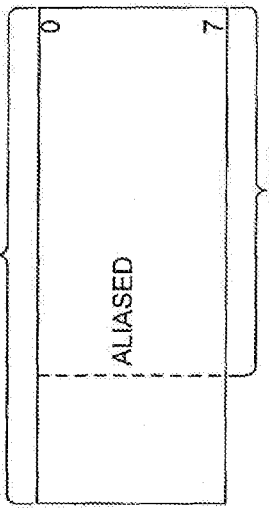
SCALAR FP STACK REGISTER FILE 1545
(X87FP)
80 BITS
ALIASED
64 BITS
MMX PACKED INT FLAT REGISTER FILE 1550
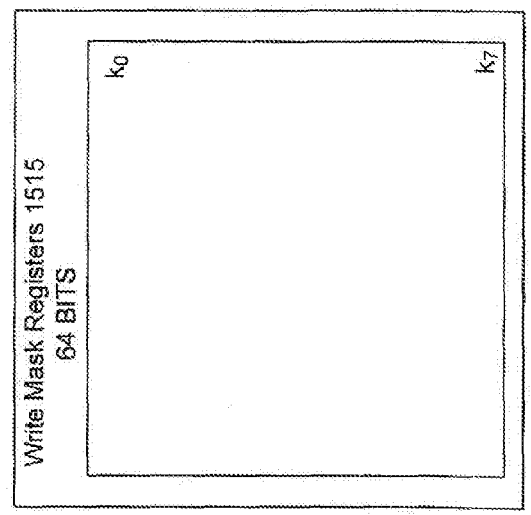
Write Mask Registers 1515
64 BITS
$k_0$
$k_7$
REGISTER ARCHITECTURE 1500
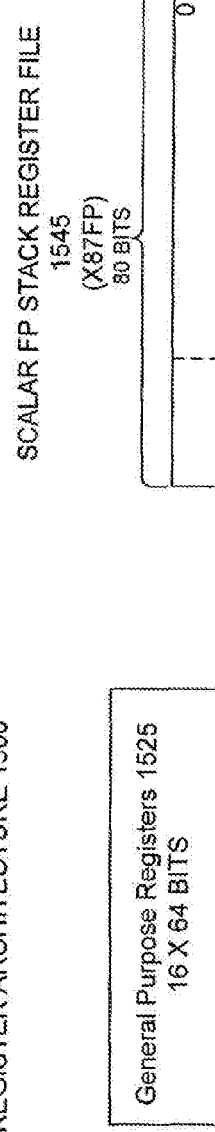
General Purpose Registers 1525
16 X 64 BITS
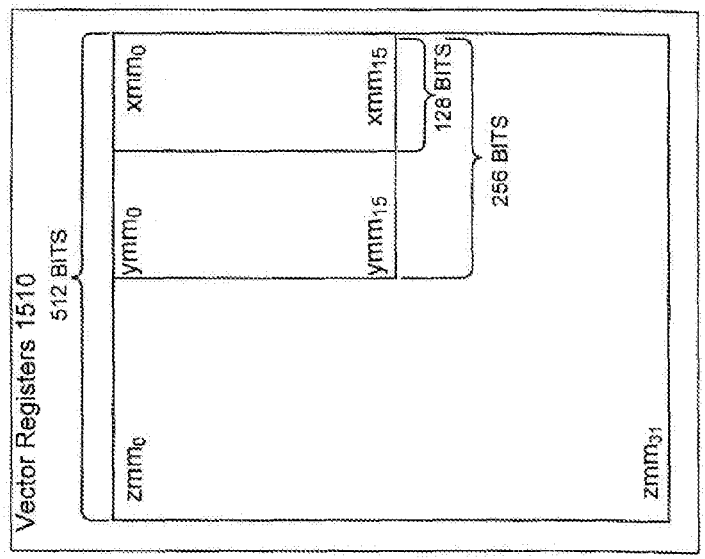
Vector Registers 1510
512 BITS
$xmm_0$
$ymm_0$
$zmm_0$
$xmm_{15}$
128 BITS
$ymm_{15}$
256 BITS
$zmm_{31}$

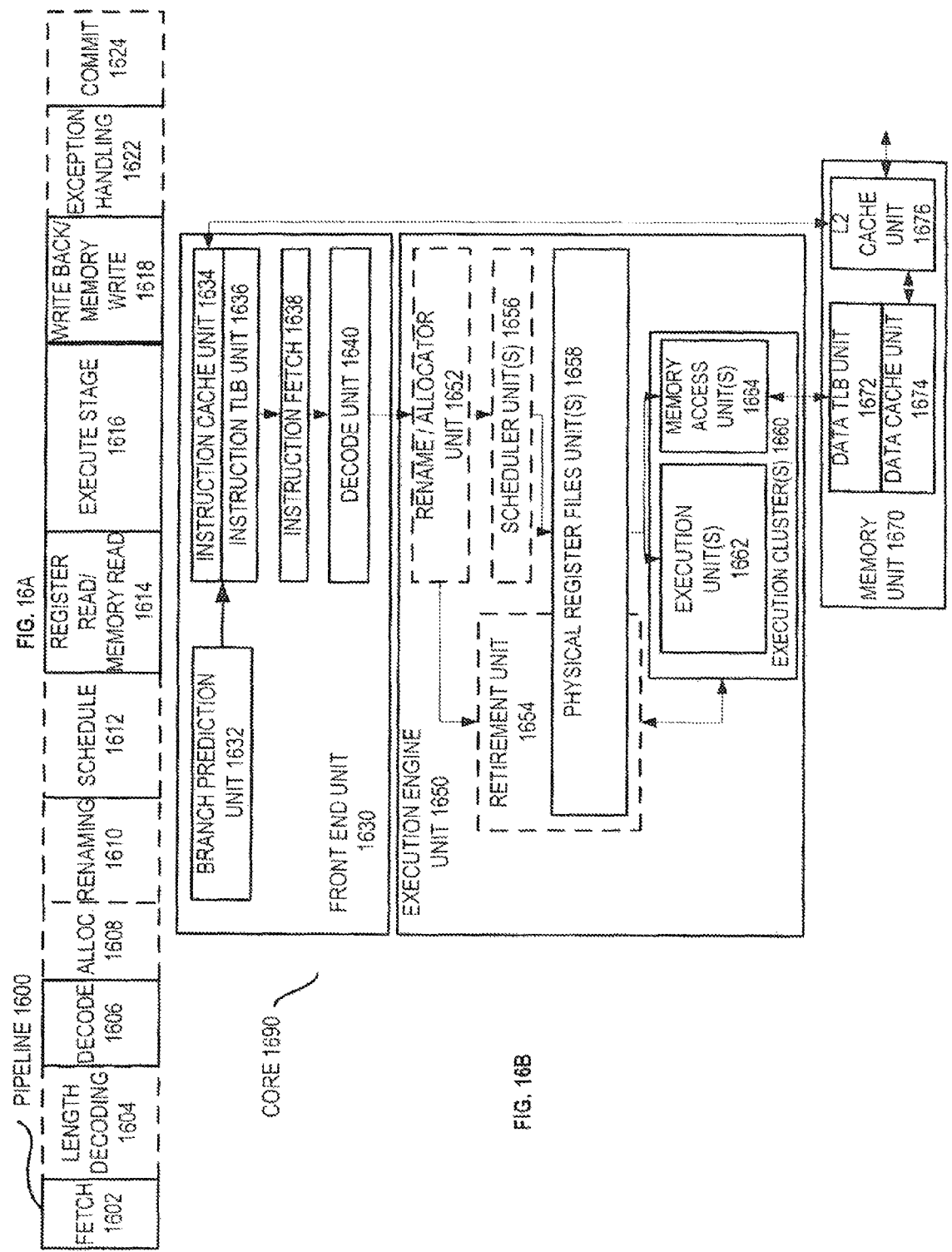

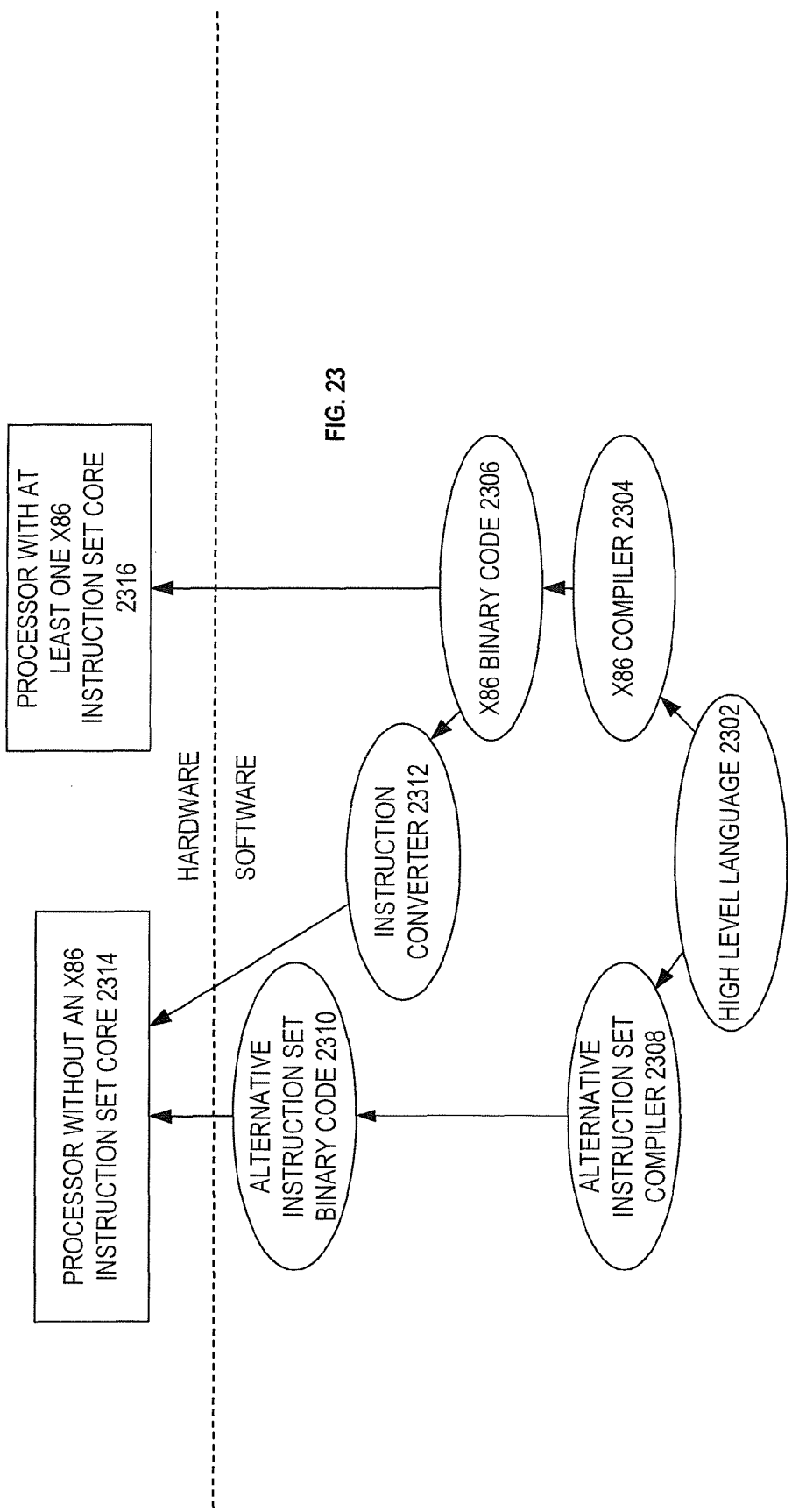

LIMITED RANGE VECTOR MEMORY ACCESS INSTRUCTIONS, PROCESSORS, METHODS, AND SYSTEMS

RELATED APPLICATIONS

The present application is a continuation of U.S. patent application Ser. No. 13/838,544, filed on Mar. 15, 2013, entitled "LIMITED RANGE VECTOR MEMORY ACCESS INSTRUCTIONS, PROCESSORS, METHODS, AND SYSTEMS", which is hereby incorporated herein by reference in its entirety and for all purposes.

BACKGROUND

1. Technical Field

Embodiments relate to processors. In particular, embodiments relate to processors to execute memory access instructions.

2. Background Information

Processors are commonly operable to execute instructions to access memory. For example, processors may execute load instructions to load or read data from memory and/or store instructions to store or write data to memory.

Certain processors are operable to execute vector load instructions. These vector load instructions are also referred to in the arts as vector gather instructions, or simply gather instructions. Intel® Advanced Vector Extensions Programming Reference, document reference number 319433-011, published June 2011, describes several vector gather (VGATHER) instructions. Examples include VGATHERDPD, VGATHERQPD, VGATHERDPS, VGATHERQPS, VPGATHERDD, VPGATHERQD, VPGATHERDQ, and VPGATHERQQ. These vector gather instructions may be used to gather, read, or load multiple data elements from memory, using multiple corresponding memory indices.

BRIEF DESCRIPTION OF THE DRAWINGS

The invention may best be understood by referring to the following description and accompanying drawings that are used to illustrate embodiments. In the drawings:

FIG. 12A illustrates an exemplary AVX instruction format including a VEX prefix, real opcode field, Mod R/M byte, SIB byte, displacement field, and IMM8.

FIG. 12B illustrates which fields from FIG. 12A make up a full opcode field and a base operation field.

FIG. 12C illustrates which fields from FIG. 12A make up a register index field.

FIG. 14A is a block diagram illustrating an exemplary specific vector friendly instruction format according to embodiments of the invention.

FIG. 14B is a block diagram illustrating the fields of the specific vector friendly instruction format that make up the full opcode field according to one embodiment of the invention.

FIG. 14C is a block diagram illustrating the fields of the specific vector friendly instruction format that make up the register index field according to one embodiment of the invention.

FIG. 15 is a block diagram of a register architecture according to one embodiment of the invention.

FIG. 16A is a block diagram illustrating both an exemplary in-order pipeline and an exemplary register renaming, out-of-order issue/execution pipeline according to embodiments of the invention.

FIG. 16B is a block diagram illustrating both an exemplary embodiment of an in-order architecture core and an exemplary register renaming, out-of-order issue/execution architecture core to be included in a processor according to embodiments of the invention.

FIG. 23 is a block diagram contrasting the use of a software instruction converter to convert binary instructions in a source instruction set to binary instructions in a target instruction set according to embodiments of the invention.

DETAILED DESCRIPTION OF EMBODIMENTS

Disclosed herein are limited range vector memory access instructions, processors to execute the instructions, methods performed by the processors when processing or executing the instructions, and systems incorporating one or more processors to process or execute the instructions. In the following description, numerous specific details are set forth (e.g., specific instructions, instruction formats, packed data formats, processor configurations, microarchitectural details, orders of operations, etc.). However, embodiments may be practiced without these specific details. In other instances, well-known circuits, structures and techniques have not been shown in detail in order to avoid obscuring the understanding of the description.

Figure 1:
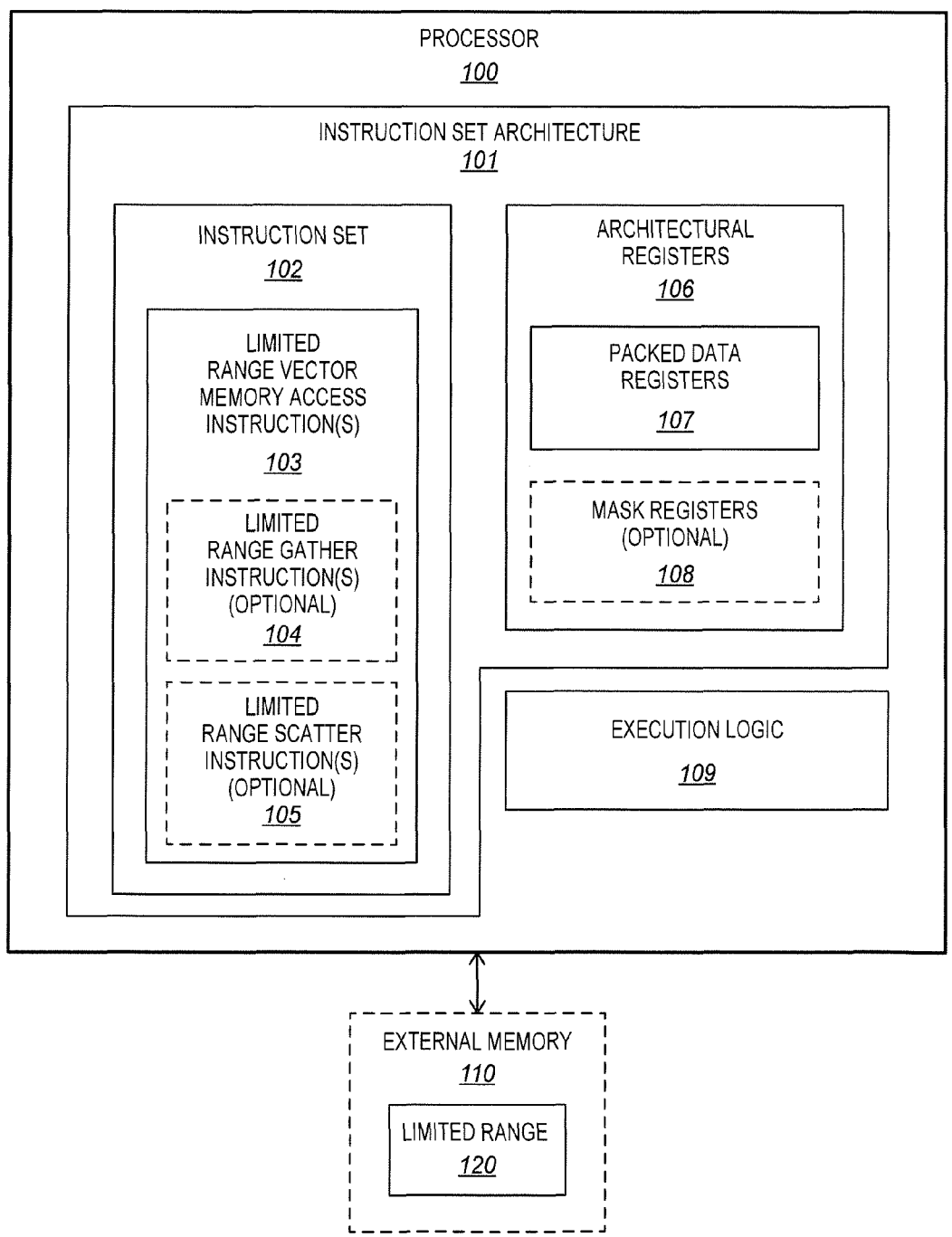
FIG. 1 is a block diagram of an embodiment of a processor to execute one or more limited range vector memory access instructions.

FIG. 1 is a block diagram of an embodiment of a processor 100 operable to execute one or more limited range vector memory access instruction(s) 103. In some embodiments, the processor may be a general-purpose processor (e.g., of the type used in desktop, laptop, tablet, handheld, cellular phone, and like computing devices). Alternatively, the processor may be a special-purpose processor. Examples of suitable special-purpose processors include, but are not limited to, graphics processors, network processors, communications processors, cryptographic processors, co-processors, and digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor has an instruction set architecture (ISA) 101. The ISA represents a part of the architecture of the processor related to programming and includes the native instructions, architectural registers, data types, addressing modes, memory architecture, interrupt and exception handling, and external input and output (I/O) of the processor. The ISA is distinguished from the microarchitecture, which represents the particular design techniques used to implement the ISA.

The ISA includes architecturally-visible registers 106 (e.g., an architectural register file). The architectural registers generally represent on-die processor storage locations. The architectural registers are also referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by microinstructions, reorder buffers, retirement registers, etc.). The illustrated registers include packed data registers 107. Each of the packed data registers is operable to store packed data, vector data, or SIMD data. In some embodiments, the registers may also optionally include packed data operation mask registers 108, although this is not required.

The ISA includes an instruction set 101 that is supported by the processor. The instructions of the instruction set represent assembly language instructions, machine-level instructions, or macroinstructions (e.g., instructions provided to the processor for execution), as opposed to microinstructions or micro-ops (e.g., those which result from a decoder decoding macroinstructions). The instruction set includes the one or more limited range vector memory access instruction(s) 103 that are each operable to cause the processor to access a limited range 120 of an external memory 110. In some embodiments, the limited range 120 may represent only a portion or subset (e.g., a contiguously indexable portion or subset) of the external memory 110. In some embodiments, the instruction(s) 103 may optionally include one or more limited range vector gather instruction(s) 104 operable to cause the processor to read, load, or gather data elements from potentially non-contiguous locations in the limited range 120 of the external memory 110. In some embodiments, the instruction(s) 103 may optionally include one or more limited range vector scatter instruction(s) 105 operable to cause the processor to write, store, or scatter data elements to potentially non-contiguous locations in the limited range 120 of the external memory 110. In various embodiments, there may be anywhere from a single limited range vector memory access instruction to multiple or many such instructions.

The processor also includes execution logic 109. The execution logic is operable to execute or process the limited range vector memory access instruction(s) 103 and to access the limited range responsive to the instructions (e.g., gather elements from the limited range or scatter elements to the limited range. Examples of suitable execution logic include, but are not limited to, execution units, functional units, memory access units, memory execution units, gather units, scatter units, and the like.

Figure 2:
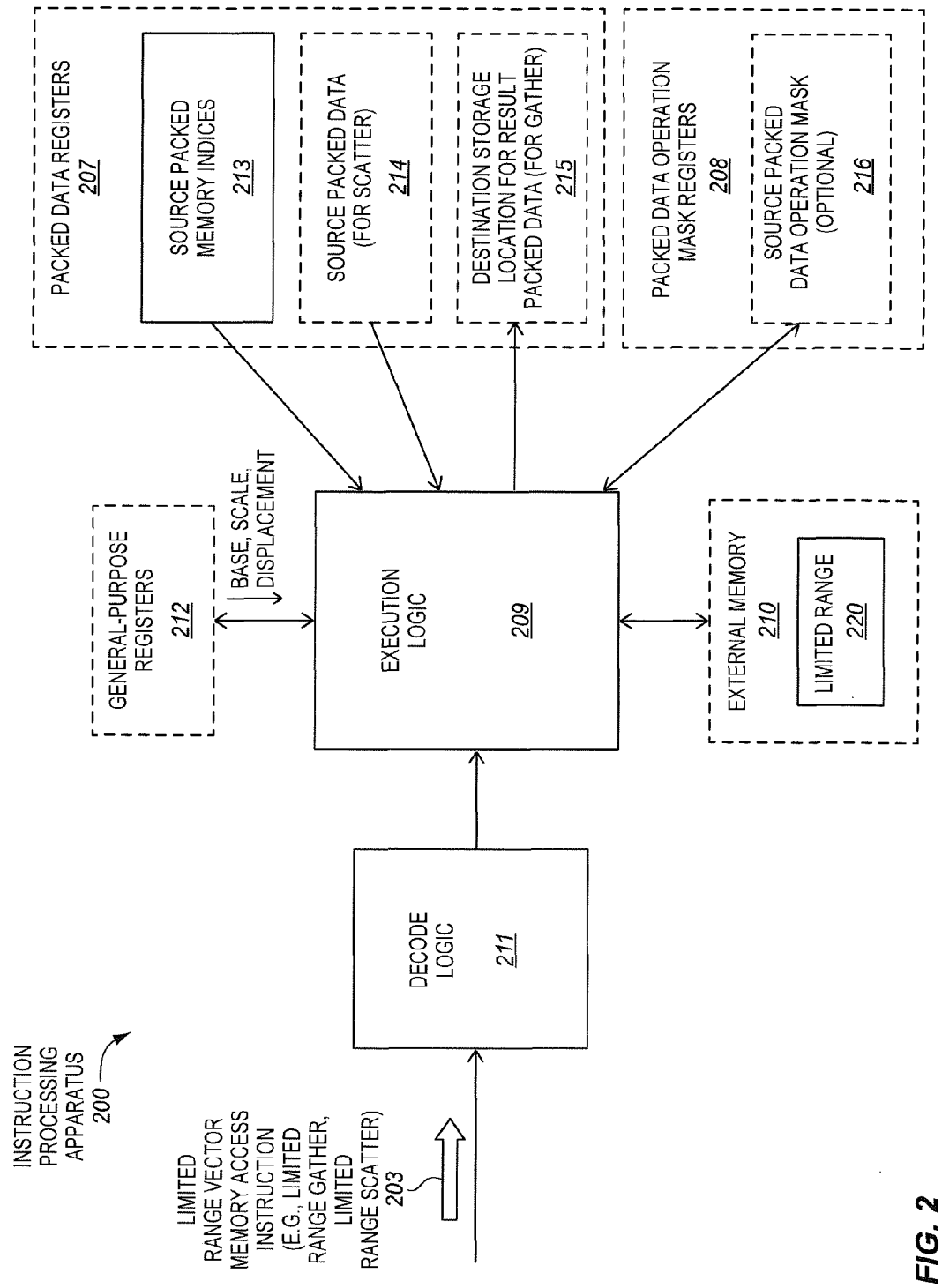
FIG. 2 is a block diagram of an embodiment of an instruction processing apparatus to process one or more limited range vector memory access instructions.

FIG. 2 is a block diagram of an embodiment of an instruction processing apparatus 200. In some embodiments, the instruction processing apparatus 200 may be, or may be included in, the processor of FIG. 1, or one similar. Alternatively, the instruction processing apparatus 200 may be, or may be included in, a different processor. Moreover, the processor of FIG. 1 may include a different instruction processing apparatus than that of FIG. 2.

The instruction processing apparatus 200 may receive the limited range vector memory access instruction 203. For example, the instruction may be received from an instruction fetch unit, an instruction queue, a memory, etc. In some embodiments, the instruction may represent a limited range vector gather instruction or a limited range vector scatter instruction.

The apparatus includes a set of packed data registers 207. In some embodiments, the apparatus may optionally include a set of packed data operation mask registers 208, although this is not required. The registers may represent architectural on-processor (e.g., on-die) processor storage locations. The registers may be implemented in different ways in different microarchitectures using well-known techniques, and are not limited to any particular type of circuit. Examples of suitable types of registers include, but are not limited to, dedicated physical registers, dynamically allocated physical registers using register renaming, and combinations thereof.

The limited range vector memory access instruction may explicitly specify (e.g., through one or more bits or a field) or otherwise indicate (e.g., implicitly indicate) a source packed memory indices 213 having a plurality of packed memory indices. In some embodiments, the packed memory indices may be packed 8-bit byte memory indices or packed 16-bit word memory indices. Conventionally, vector gather instructions typically implement significantly larger 32-bit or 64-bit memory indices, since they are expected to be able to gather from anywhere in the memory 210 instead of just from within the limited range 220 within the memory 210.

In the case of a vector gather instruction/operation, or a vector memory load instruction/operation, the instruction may indicate a destination storage location 215 where a result packed data, including data elements loaded or gathered from the limited range 220 of the memory 210, is to be stored. In the case of a vector scatter instruction/operation, or a vector memory store instruction/operation, the instruction may indicate a source packed data 214, including a plurality of data elements to be written or scattered to the limited range 220 of the memory 210. As shown, in the some embodiments, the source packed memory indices 213, the source packed data 214, and the destination storage location 215 may be packed data registers of the set of packed data registers 207. Alternatively, other storage locations may optionally be used for one or more of these.

In some embodiments, the limited range vector memory access instruction 203 may optionally specify or otherwise indicate a source packed data operation mask 216, although this is not required. Packed data operation masks, and their use for predication or conditional control, will be discussed further below. Other embodiments may optionally be performed without masking or predication.

Referring again to FIG. 2, the illustrated instruction processing apparatus includes decode logic 211 (e.g., a decode unit or decoder). The instruction decode logic may receive and decode higher-level machine instructions or macroinstructions (e.g., the instruction 203), and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decode logic may be implemented using various different mechanisms including, but not limited to, microcode read only memories (ROMs), look-up tables, hardware implementations, programmable logic arrays (PLAs), and other mechanisms known in the art. In other embodiments, instead of having the decode logic 211, an instruction emulator, translator, morpher, interpreter, or other instruction conversion logic (e.g., implemented in software, hardware, firmware, or a combination) may be used. In still other embodiments, a combination of instruction conversion logic and a decode logic may be used. Some or all of the instruction conversion logic may potentially be located off-die from the rest of the instruction processing apparatus, such as on a separate die or in memory.

Referring again to FIG. 2, the execution logic 209 is coupled with the decode logic 211. The execution logic is also coupled with the packed data registers 207, and in some embodiments, optionally with the packed data operation mask registers 208. Examples of suitable execution logic includes, but is not limited to, an execution unit, a functional unit, a memory access unit, a memory execution unit, a gather unit, a scatter unit, and the like. The execution logic and/or the apparatus may include specific or particular logic (e.g., circuitry, transistors, or other hardware potentially combined with software and/or firmware) operable to execute and/or process the instruction 203 and access the limited range of the memory in response to the instruction. In some embodiments, the execution unit includes at least some integrated circuitry, transistors, or other circuitry or hardware of a semiconductor die.

The execution logic is operable, in response to and/or as a result of the limited range vector memory access instruction 203 (e.g., in response to one or more control signals decoded or otherwise derived from the instruction 203) to access the limited range 220 of the memory 210. For example, in an embodiment of a limited range vector gather instruction, the execution unit may use the source packed memory indices 213 to gather or load data elements from potentially non-contiguous locations in the limited range 220 of the memory 210 and store the gathered or loaded data elements in the destination storage location 215. In an embodiment of a limited range vector scatter instruction, the execution unit may use the source packed memory indices 213 to scatter or write data elements from a source packed data 214 to potentially non-contiguous locations in the limited range 220 of the memory 210.

In some embodiments, the limited range vector memory access instruction 203 may be used to access only the limited range 220 of the memory 210. In some embodiments, the instructions indicate only 8-bit byte or 16-bit word memory indices. Conventional vector gather instructions typically allow the data elements to be gathered from anywhere in memory. As a result, typically either 32-bit or 64-bit memory indices are used. These 32-bit or 64-bit memory indices have enough bits to allow data elements to be potentially gathered from substantially anywhere in memory, or at least from a relatively large amount of memory (e.g., that capable of being addressed by either 32-bits or 64-bits).

However, one potential drawback to using 32-bit or 64-bit memory indices is that their relatively large size may tend to limit the number of such memory indices that may be stored in a single packed data register indicated as a source operand of the vector gather instructions. For example, only four 64-bit memory indices, or only eight 32-bit memory indices, may fit within a 256-bit register. Moreover, in some cases it may be desired to gather relatively smaller data elements, such as 8-bit byte data elements or 16-bit word elements. However, the relatively large size of the memory indices tends to limit the number of such 8-bit byte or 16-bit word elements that can be gathered. For example, often only the same number of data elements can be gathered as the number of 32-bit or 64-bit memory indices that fit in a packed data register. As a result, it is often not possible to gather as many of these elements as desirable due in part to the large size of the 32-bit or 64-bit memory indices.

In some embodiments, instead of such relatively large 32-bit or 64-bit memory indices, relatively smaller memory indices, such as 8-bit byte or 16-bit word memory indices, may be used by embodiments of limited range vector memory access instructions/operations. Advantageously, this may help to increase the number of such memory indices that may be stored in a single packed data register as source packed memory indices. For example, thirty two 8-bit memory indices, or sixteen 16-bit memory indices, may fit within a 256-bit register, instead of just four 64-bit memory indices or eight 32-bit memory indices. As another example, sixty four 8-bit memory indices, or thirty two 16-bit memory indices, may fit within a 512-bit register. Correspondingly, this may help to increase the number of data elements that may be gathered or scattered by an embodiment of a single limited range vector gather or scatter instruction/operation.

In some embodiments, these relatively smaller 8-bit byte or 16-bit word memory indices may be insufficient to access data elements from anywhere in memory. Rather, these smaller 8-bit or 16-bit memory indices may access data elements in only a limited range (e.g., a contiguous subset capable of being indexed by the 8-bit or 16-bit memory indices) of a larger overall memory (e.g., one that would need to be addressed by 32-bit or 64-bit memory indices). In some embodiments, the ISA supported by the processor may include one or more other memory access instructions (e.g., a vector gather instruction) that indicate and use 32-bit or 64-bit memory indices to access data elements from anywhere in the overall memory. For example, in some embodiments, the limited range corresponding to the 8-bit memory indices may consist of no more than 256 data elements or 256 storage locations that are capable of being uniquely indexed by an 8-bit byte memory index. As another example, in some embodiments, the limited range may consist of no more than 65536 data elements or 65536 storage locations that are capable of being uniquely indexed by a 16-bit byte memory index. In other embodiments, only a portion or subset of these data elements or storage locations capable of being indexed may be used as the limited range (e.g., rather than using the full range of a 16-bit index only a portion of that range may be used).

Although the limited range vector memory access instructions/operations are not capable of accessing data elements anywhere in memory, there are various reasons why it may be advantageous to access data elements from within only the limited range of a much larger memory. For example, this may be the case when a table, array, data structure, or other arrangement or collection of data can be stored in the limited range. Often, an algorithm may need to access multiple or many data elements from within the table, array, data structure, or other arrangement or collection of data at the same time. As one example, the algorithm may transpose a matrix or otherwise rearrange or restructure the data in which case it may need to access many data elements. As another example, the algorithm may access data elements that are separated by a constant stride, for example, every second, third, fourth, or Nth data element. More generally, there are many instances where an algorithm may be used to access multiple or many data elements from within an arrangement or collection data that can be stored within a limited range of memory that can be indexed by 8-bit byte or 16-bit word memory indices.

Advantageously, when used in such instances, embodiments of the limited range vector memory access instructions/operations disclosed herein may be able to access (e.g., gather or scatter) relatively more data elements within a single instruction/operation due in part to the smaller 8-bit or 16-bit memory indices. Larger indices, which would tend to limit the number of such data elements accessed, are not needed, since the data elements are being gathered from only within the limited range instead of anywhere in memory. Moreover, as will be discussed further below, in some embodiments, the limited range vector memory access instructions/operations may be more efficient to implement and/or may be faster than conventional vector gather instructions/operations which use sequential accesses for each of the accessed data elements (e.g., because fewer memory accesses each involving multiple data elements may be performed).

To avoid obscuring the description, a simple instruction processing apparatus 200 has been described, although the instruction processing apparatus may optionally include one or more other conventional components. Examples of such conventional components include, but are not limited to, an instruction fetch unit, an instruction scheduling unit, a branch prediction unit, instruction and data caches, instruction and data translation lookaside buffers (TLB), prefetch buffers, microinstruction queues, microinstruction sequencers, bus interface units, a retirement/commit unit, a register renaming unit, and other components conventionally employed in processors. Moreover, embodiments may have multiple cores, logical processors, or execution engines having either the same or different instruction set and/or ISA. There are literally numerous different combinations and configurations of such components in processors, and embodiments are not limited to any particular such combination or configuration.

Figure 3:
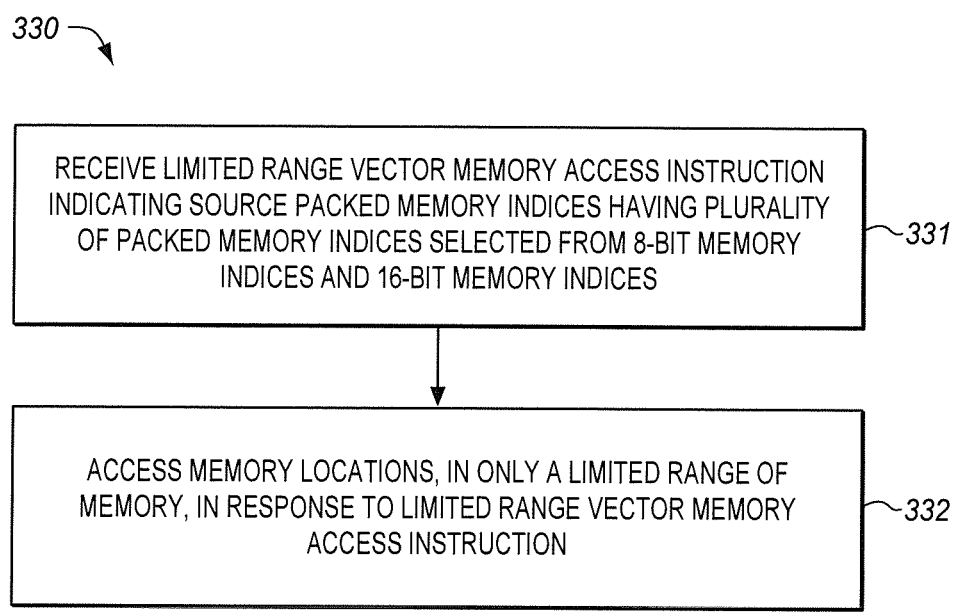
FIG. 3 is a block flow diagram of an embodiment of a method of accessing a limited range of memory in response to a limited range vector memory access instruction.

FIG. 3 is a block flow diagram of an embodiment of a method 330 of processing an embodiment of an instruction. In various embodiments, the method may be performed by a general-purpose processor, special-purpose processor, or other instruction processing apparatus or digital logic device. In some embodiments, the operations and/or method of FIG. 3 may be performed by and/or within the processor of FIG. 1 and/or the apparatus FIG. 2. The components, features, and specific optional details described herein for the processor and apparatus of FIGS. 1-2 also optionally apply to the operations and/or method of FIG. 3. Alternatively, the operations and/or method of FIG. 3 may be performed by and/or within a similar or entirely different processor or apparatus. Moreover, the processor of FIG. 1 and/or the apparatus of FIG. 2 may perform operations and/or methods the same as, similar to, or entirely different than those of FIG. 3.

The method includes receiving the limited range vector memory access instruction, at block 331. In various aspects, the instruction may be received at a processor, an instruction processing apparatus, or a portion thereof (e.g., an instruction fetch unit, a decoder, an instruction converter, etc.). In various aspects, the instruction may be received from an off-die source (e.g., from a DRAM memory, a disc, interconnect, etc.), or from an on-die source (e.g., from an instruction cache). The limited range vector memory access instruction may indicate a source packed memory indices having a plurality of packed memory indices. In some embodiments, the memory indices may be one of 8-bit memory indices and 16-bit memory indices. In some embodiments, the memory indices may be 8-bit memory indices. In some embodiments, the source packed memory indices may include at least 32 memory indices.

Memory locations, in only a limited range of a memory, may be accessed in response to the limited range vector memory access instruction, at block 332. In some embodiments, the limited range may be accessed with one or more memory addresses of 32-bits or 64-bits each. In some embodiments, the limited range may include only 256 bytes. In some embodiments, as will be explained further below, the access may be performed through multiple data element loads that may load multiple data elements each, including both needed and un-needed data elements. Such multi-element loads may help to improve speed or efficiency in some embodiments. In some embodiments, the entire limited range may be loaded from the memory to storage locations of the processor (e.g., on-die registers).

The illustrated method involves architecturally visible operations (e.g., those visible from a software perspective). In other embodiments, the method may optionally include one or more microarchitectural operations. By way of example, the instruction may be fetched, decoded, scheduled out of order, source operands may be accessed, an execution logic may be enabled to perform microarchitectural to implement the operations of the instruction, the execution logic may perform the microarchitectural operations, results may be put back into program order, etc.

Figure 4:
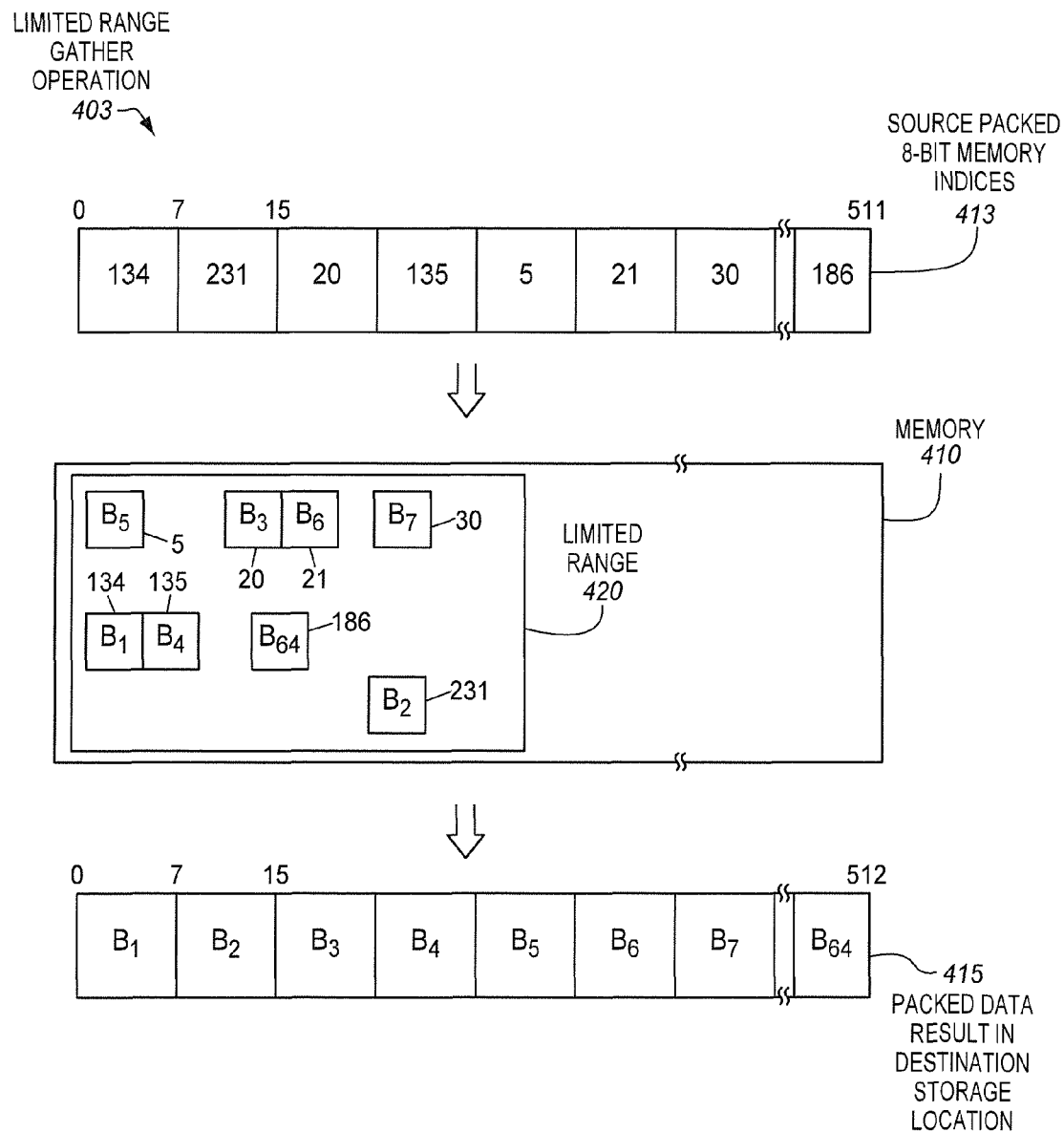
FIG. 4 is a block diagram illustrating an embodiment of a limited range vector gather operation.

FIG. 4 is a block diagram illustrating an embodiment of a limited range gather operation 403 that may be performed in response to an embodiment of a limited range gather instruction. The limited range gather instruction may specify or otherwise indicate a source packed memory indices 413 having a plurality of packed memory indices. As shown, in some embodiments, the memory indices may be 8-bit byte memory indices and the source packed memory indices may be 512-bits wide and may include sixty-four 8-bit byte memory indices. Alternatively, in other embodiments 16-bit word memory indices, or other memory indices less than 32-bits, may optionally be used. Moreover, in other embodiments, other packed data widths besides 512-bits may optionally be used, such as, for example, 64-bit, 128-bit, 256-bit, or 1024-bit packed data widths. By way of example, the 64-bit, 128-bit, and 256-bit widths may, respectively, be able to store eight, sixteen, and thirty-two 8-bit byte memory indices, or half as many each of the 16-bit word memory indices. In the illustrated example, the memory indices have the values, from the least significant position (on the left) to the most significant position (on the right) right, 134, 231, 20, 135, 5, 21, 30, . . . 186. These values are only examples.

An embodiment of a limited range vector gather operation may be performed in response to and/or as a result of the embodiment of the limited range gather instruction. The limited range vector gather operation may load or gather data elements from a limited range 420 of a memory 410. As discussed previously, the limited range may represent only a small subset (e.g., a contiguous subset capable of being indexed by the 8-bit or 16-bit memory indices) of the overall generally much larger memory (e.g., which may be indexed by other instructions using 32-bit or 64-bit memory indices). The extent or size of the limited range may be based on the width in bits of the memory indices. For example, each 8-bit byte memory index may be operable to uniquely index or address any of 256 different locations or data elements, and in some embodiments, the limited range may include only those 256 locations or data elements (e.g., 256 bytes or words). The gathered data elements may be indicated by the corresponding memory indices of the source packed memory indices 413. Each memory index may point to a corresponding memory location and/or a data element stored therein. For example, in the illustrated embodiment, the memory index 134 points to the memory location in the limited range that stores data element B1, the memory index 231 points to the memory location in the limited range that stores data element B2, and so on.

A packed data result 415 may be stored in a destination storage location in response to and/or as a result of the limited range vector gather instruction/operation. In one aspect, the instruction may specify or otherwise indicate the destination storage location. In some embodiments, the packed data result may include data elements gathered from potentially non-contiguous regions from within only the limited range 420 but not from within other portions of the memory 410. As shown, in some embodiments, the packed data result may be 512-bits wide and may include sixty-four 8-bit byte data elements. Alternatively, 16-bit word or 32-bit doubleword data elements may be gathered and may be stored in either wider or narrower result packed data. In the illustrated example, the packed data result in the destination stores, from the least significant position (on the left) to the most significant position (on the right) right, the data elements B1, B2, B3, B4, B5, B6, B7, . . . B64. This is just one example.

Figure 5:
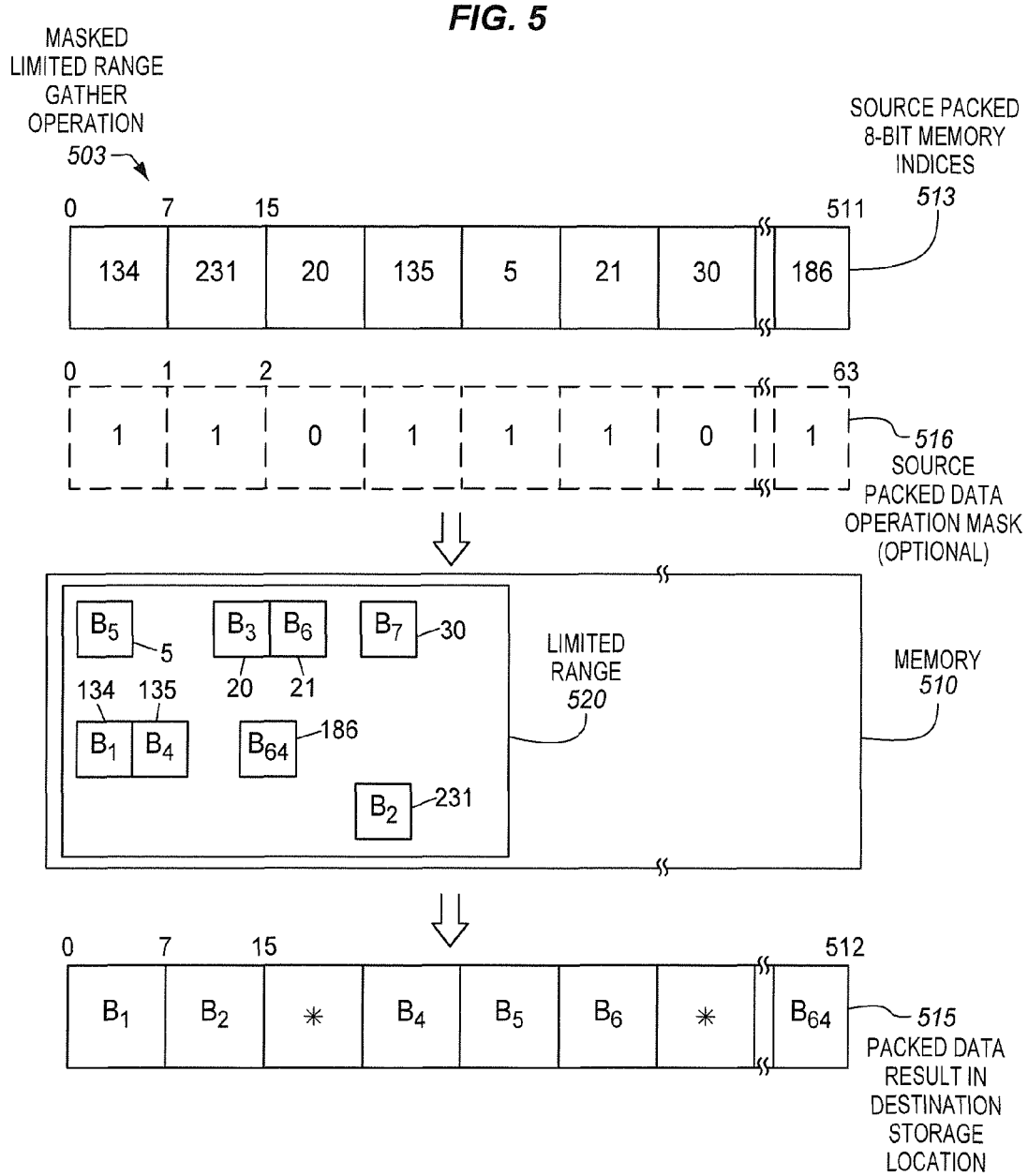
FIG. 5 is a block diagram illustrating an embodiment of a masked limited range vector gather operation.

FIG. 5 is a block diagram illustrating an embodiment of a masked limited range gather operation 503 that may be performed in response to an embodiment of a masked limited range gather instruction. The masked operation of FIG. 5 has certain similarities to the unmasked operation of FIG. 4. To avoid obscuring the description, the different and/or additional characteristics for the masked operation of FIG. 5 will primarily be described without repeating all the similar or common characteristics relative to the unmasked operation of FIG. 4. However, it is to be appreciated that the these previously described characteristics of the unmasked operation also optionally apply to FIG. 5 unless clearly apparent otherwise.

The masked limited range gather instruction may specify or otherwise indicate a source packed memory indices 513 that has a plurality of packed memory indices. As shown, in some embodiments, the memory indices may be 8-bit byte memory indices and the source packed memory indices may be 512-bits wide and may include sixty-four 8-bit byte memory indices. Alternatively, in other embodiments 16-bit word memory indices, or other memory indices less than 32-bits, may optionally be used. Moreover, in other embodiments, other packed data widths besides 512-bits may optionally be used, such as, for example, 64-bit, 128-bit, 256-bit, or 1024-bit packed data widths.

In some embodiments, the masked limited range gather instruction may optionally specify or otherwise indicate a source packed data operation mask 516. The packed data operation mask may also be referred to herein simply as an operation mask, predicate mask, or mask. The mask may represent a predicate operand or conditional control operand that is used to mask, predicate, or conditionally control whether or not operations (e.g., gather operations) are to be performed. In some embodiments, the masking or predication may be at per-data element granularity such that operations on different data elements may be predicated or conditionally controlled separately and/or independently of others. The operation mask may include multiple mask elements, predicate elements, or conditional control elements. In one aspect, the elements may be included in a one-to-one correspondence with corresponding source data elements and/or result data elements. As shown, in some embodiments, each mask element may be a single mask bit. A value of each mask bit may control whether or not an operation (e.g., a gather operation) is to be performed. According to one possible convention, each mask bit may have a first value (e.g., be set to binary 1) to allow the gather operation to be performed and a result data element to be stored in the destination storage location, or a second value (e.g., be cleared to binary 0) to not allow the gather operation to be performed and/or not allow a gathered data element to be stored in the destination storage location.

As shown, in the case of the source packed memory indices 513 being 512-bits wide, and having sixty four 8-bit memory indices, the source packed data operation mask 516 may be 64-bits wide with each bit representing a predicate or mask bit. Alternatively, the source packed data operation mask may have other widths, for example, a width in bits equal to the number of memory indices in the source packed memory indices 513 (e.g., eight, sixteen, thirty two, etc.). In the illustrated example, the mask bits, from least significant (on the left) to most significant (on the right), are 1, 1, 0, 1, 1, 1, 0, . . . 1. This is just one example. According to the illustrated convention, a mask bit value of binary 0 represents a masked out element, whereas a mask bit value of binary 1 indicates an unmasked element. For each unmasked element, the associated gather operation is to be performed and the gathered data element is to be stored in the corresponding data element of the packed data result 515. Each mask bit corresponds to a memory index and result data element in a corresponding position. For example, in the illustration the corresponding positions are in vertically alignment one above the other.

An embodiment of a masked limited range vector gather operation 503 may be performed in response to and/or as a result of the embodiment of the masked limited range gather instruction. The operation may load or gather data elements from a limited range 520 of a memory 510 subject to the conditional control of the source packed data operation mask 516. A packed data result 515 may be stored in a destination storage location in response to and/or as a result of the masked limited range vector gather instruction/operation. In some embodiments, data may only be gathered if the corresponding mask bit in the packed data operation mask is set to one. Asterisks (*) are shown in positions of the result packed data where the corresponding mask bits are masked out (e.g., in the illustrated example cleared to binary 0). As shown, in some embodiments, the packed data result may be 512-bits wide and may include sixty-four 8-bit byte data elements. Alternatively, 16-bit word or 32-bit doubleword data elements may be gathered and may be stored in either wider or narrower result packed data. In the illustrated example, the packed data result in the destination stores, from the least significant position (on the left) to the most significant position (on the right) right, the data elements B1, B2, *, B4, B5, B6, *, . . . B64.

In some embodiments, merging-masking may be performed. In merging-masking, when a given destination data element is masked out, the initial or pre-existing value of the data element in the destination storage location may be preserved unchanged (i.e., not be updated with a result of the operation). In other embodiments, zeroing-masking may be performed. In zeroing-masking, when a given destination data element is masked out, the corresponding given destination data element may be zeroed out or a value of zero may be stored in the corresponding given destination data element. Alternatively, other predetermined values may be stored in the masked out destination data elements. Accordingly, in various embodiments, the data element positions indicated by the asterisks (*) may have zeroed out values or the values of data elements initially in the destination storage location prior to the gather operation.

Figure 6:
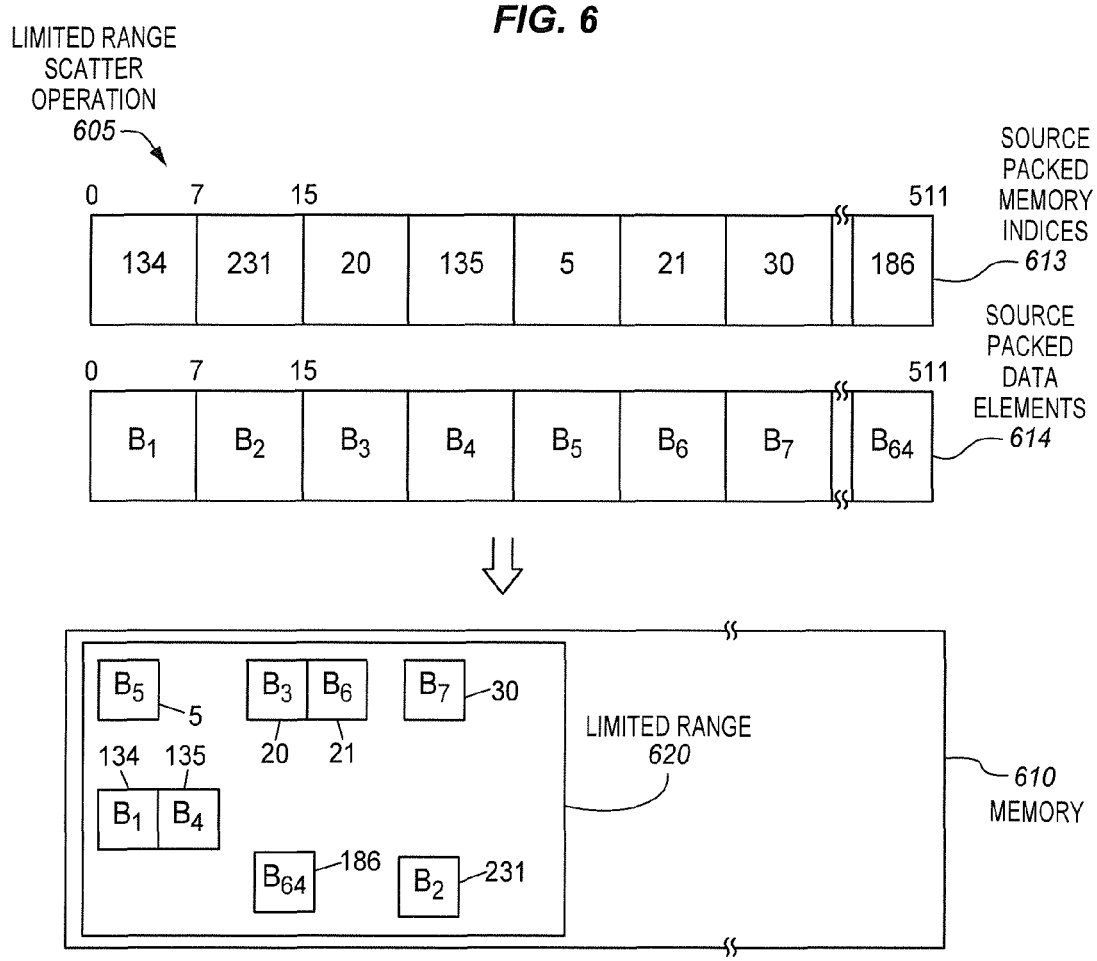
FIG. 6 is a block diagram illustrating an embodiment of a limited range vector scatter operation.

FIG. 6 is a block diagram illustrating an embodiment of a limited range scatter operation 605 that may be performed in response to an embodiment of a limited range scatter instruction. The limited range scatter instruction may specify or otherwise indicate a source packed memory indices 613 having a plurality of packed memory indices. As shown, in some embodiments, the memory indices may be 8-bit byte memory indices and the source packed memory indices may be 512-bits wide and may include sixty-four 8-bit byte memory indices. Alternatively, in other embodiments 16-bit word memory indices, or other memory indices less than 32-bits, may optionally be used. Moreover, in other embodiments, other packed data widths besides 512-bits may optionally be used, such as, for example, 64-bit, 128-bit, 256-bit, or 1024-bit packed data widths.

The limited range scatter instruction may also specify or otherwise indicate a source packed data 614 having a plurality of packed data elements that are to be scattered. As shown, in some embodiments, the packed data elements may be 8-bit byte data elements, and the source packed data 614 may be 512-bits wide and may include sixty-four of such 8-bit byte data elements. Alternatively, in other embodiments 16-bit word data elements, or 32-bit doubleword data elements, may optionally be used. Moreover, in other embodiments, other widths for the source packed data besides 512-bits may optionally be used, such as, for example, 64-bit, 128-bit, 256-bit, or 1024-bit packed data widths. In some embodiments, the widths of the memory indices ma may be the same as the width of the data elements, although this is not required (e.g., a twice as wide register may be used for the data elements than for the memory indices).

An embodiment of a limited range vector scatter operation may be performed in response to and/or as a result of the embodiment of the limited range scatter instruction. The limited range vector scatter operation may store, write, or scatter data elements to a limited range 620 of a memory 610. As discussed elsewhere herein, the limited range may represent only a small subset (e.g., a contiguous subset capable of being indexed by the 8-bit or 16-bit memory indices) of the overall generally much larger memory 610 (e.g., which may be indexed by other instructions using 32-bit or 64-bit memory indices). The limited range 620 may have any of the optional characteristics or attributes of the limited ranges described elsewhere herein. The source packed data elements 614 may be scattered to locations indicated by and/or derived from the source packed memory indices 613. Each memory index may point to a corresponding memory location. In some embodiments, the data elements may be scattered to optionally/potentially non-contiguous memory locations within only the limited range 620 but not from within other portions of the larger memory 610. For example, in the illustrated embodiment, the memory index 134 points to the memory location in the limited range where the data element B1 is to be written, the memory index 231 points to the memory location in the limited range where the data element B2 is to be written, and so on.

Figure 7:
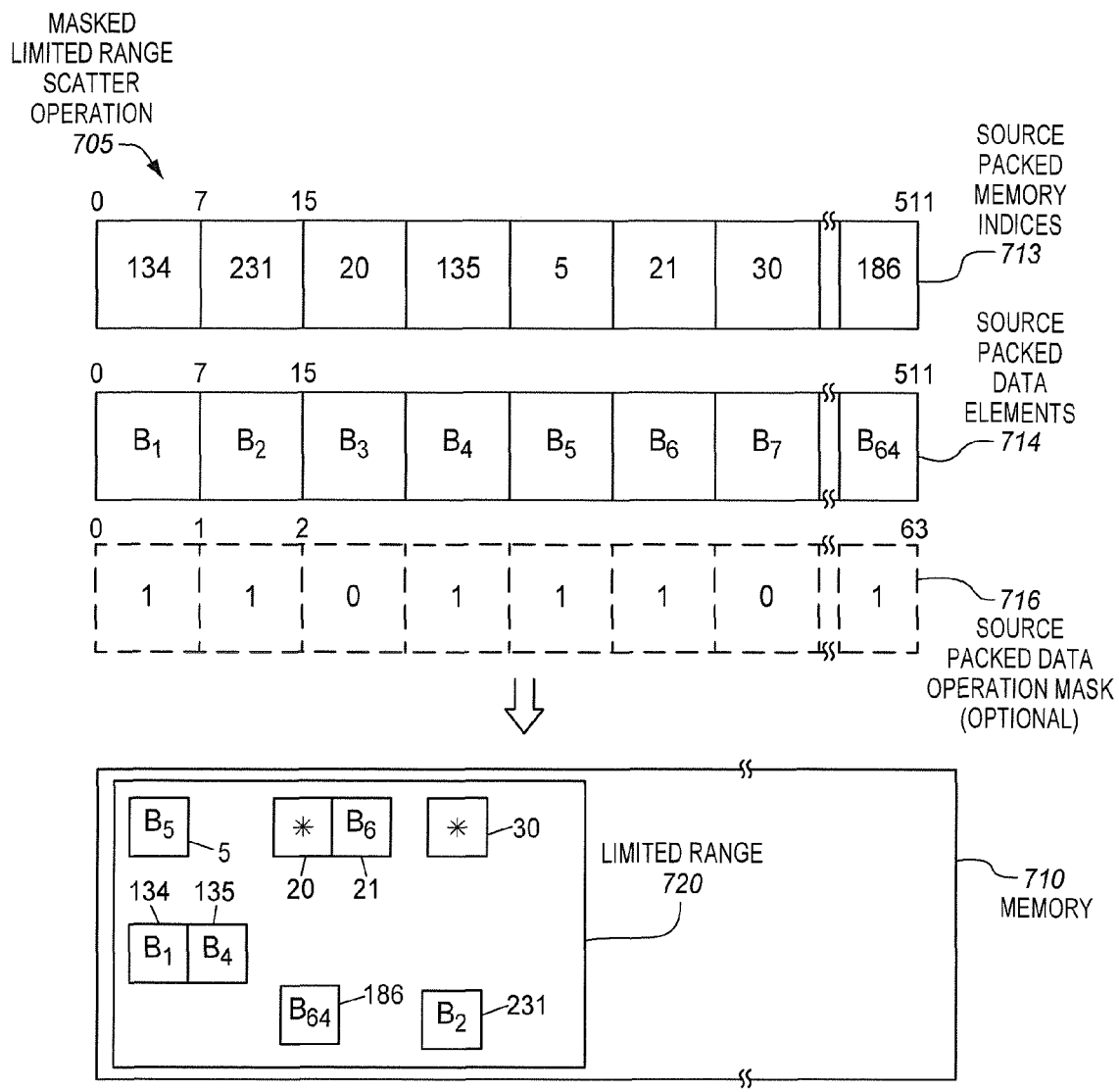
FIG. 7 is a block diagram illustrating an embodiment of a masked limited range vector scatter operation.

FIG. 7 is a block diagram illustrating an embodiment of a masked limited range scatter operation 705 that may be performed in response to an embodiment of a masked limited range scatter instruction. The masked operation of FIG. 7 has certain similarities to the unmasked operation of FIG. 6. To avoid obscuring the description, the different and/or additional characteristics for the masked operation of FIG. 7 will primarily be described without repeating all the similar or common characteristics relative to the unmasked operation of FIG. 6. However, it is to be appreciated that the previously described characteristics of the unmasked operation also optionally apply to FIG. 7 unless clearly apparent otherwise.

The masked limited range scatter instruction may specify or otherwise indicate a source packed memory indices 713 having a plurality of packed memory indices. As shown, in some embodiments, the memory indices may be 8-bit byte memory indices and the source packed memory indices may be 512-bits wide and may include sixty-four 8-bit byte memory indices. Alternatively, in other embodiments 16-bit word memory indices, or other memory indices less than 32-bits, may optionally be used. Moreover, in other embodiments, other packed data widths besides 512-bits may optionally be used, such as, for example, 64-bit, 128-bit, 256-bit, or 1024-bit packed data widths.

The limited range scatter instruction may also specify or otherwise indicate a source packed data 714 having a plurality of packed data elements that are to be scattered. As shown, in some embodiments, the packed data elements may be 8-bit byte data elements, and the source packed data 614 may be 512-bits wide and may include sixty-four of such 8-bit byte data elements. Alternatively, in other embodiments 16-bit word data elements, or 32-bit doubleword data elements, may optionally be used. Moreover, in other embodiments, other widths for the source packed data besides 512-bits may optionally be used, such as, for example, 64-bit, 128-bit, 256-bit, or 1024-bit packed data widths.

In some embodiments, the masked limited range scatter instruction may optionally specify or otherwise indicate a source packed data operation mask 716. The mask 716 may optionally have any of the characteristics or attributes of the other packed data operation masks, predicate masks, or conditional control operands described elsewhere herein. As shown, in the case of the source packed memory indices having sixty four memory indices and/or the source packed data having sixty four data elements, the source packed data operation mask 716 may be 64-bits wide with each bit may represent a predicate or mask bit for a corresponding data element and/or memory index in a corresponding relative position. Alternatively, the source packed data operation mask may have other widths, for example, a width in bits equal to the number of memory indices and/or the number of data elements. According to the illustrated convention, a mask bit value of binary 0 represents a masked out element, whereas a mask bit value of binary 1 indicates an unmasked element.

An embodiment of a limited range vector scatter operation may be performed in response to and/or as a result of the embodiment of the limited range scatter instruction. The limited range vector scatter operation may store, write, or scatter data elements to a limited range 720 of a larger memory 710. As discussed elsewhere herein, the limited range may represent only a small subset (e.g., a contiguous subset capable of being indexed by the 8-bit or 16-bit memory indices) of the overall generally much larger memory (e.g., which may be indexed by other instructions using 32-bit or 64-bit memory indices). The limited range 720 may have any of the optional characteristics or attributes of the limited ranges described elsewhere herein. The source packed data elements 714 may be scattered to locations indicated by and/or derived from the source packed memory indices 713 under the predicated or conditional control of the source packed data operation mask 716. In some embodiments, the data elements may be scattered to optionally/potentially non-contiguous memory locations within only the limited range 720 but not from within other portions of the larger memory 710. For example, in the illustrated embodiment, the data element B1 may be written to the location in the limited range indicated by the memory index value 134, the data element B2 may be written to the location in the limited range indicated by the memory index value 231, and so on. In the illustrated example, the data element B3 for memory index value 20, and the data element B7 for memory index value 30, are masked out such that a scatter may not be performed. This is indicated in the illustration by asterisks (*) in the locations corresponding to memory index value 20 and memory index value 30. In some cases, these memory locations may have their preexisting values before the scatter operation (e.g., may not be changed by the scatter operation).

The following pseudocode represents an example embodiment of a limited range vector gather instruction/operation VXLATB:

VXLATB zmm1 {k1}, vm8z; ///Other vector lengths are also allowed
(KL, VL)=(16, 128), (32, 256), (64, 512)
FOR j 0 TO KL-1
  i←j*8
  IF k1 [j]
    THEN DEST[i+7:i]←MEM[BASE_ADDR+ SignExtend(VINDEX[i+7:i])* SCALE+DISP]
    ELSE *DEST[i+7:i]←remains unchanged*
      ;Merging masking is used
  FI;
ENDFOR
DEST[MAX_VL-1:VL]←0

The following pseudocode represents an example embodiment of a limited range vector gather instruction/operation VBTALXB:

VBTALXB zmm1 {k1}, vm8z; ///Other vector lengths are also allowed
(KL, VL)=(16, 128), (32, 256), (64, 512)
FOR j←0 TO KL-1
  i←j*8
  IF k1[j]
    THEN MEM[BASE_ADDR+SignExtend(VINDEX [i+7:i])* SCALE+DISP]←SRC[i+7:i]
    ELSE *DEST[i+7:i]←remains unchanged*
      ;Merging masking is used
  FI;
ENDFOR In the above pseudocode, zmm1 represents a 512-bit packed data register. The register zmm1 is used as a destination (DEST) for VXLATB and as a source (SRC) for VBTALXB. The k1 represents a 64-bit mask register. KL represents a mask length, and VL represents a vector length, and these are selected from any one of (16, 128), (32, 256), (64, 512) for either instruction. The vm8z represents a vector array of memory operands specified using vector scale index base memory addressing. The array of memory addresses are specified using a common base register, a constant scale factor, and a vector index register with individual elements of 8-bit index value in an 512-bit ZMM register. VINDEX represents the vector of memory indexes. The SignExtend represents a sign extension operation on the memory index VINDEX. BASE_ADDR represents a base address and SCALE represents a scale as commonly used in memory access. The symbol ← represents storing. The i and j are loop counters.

Figure 8:
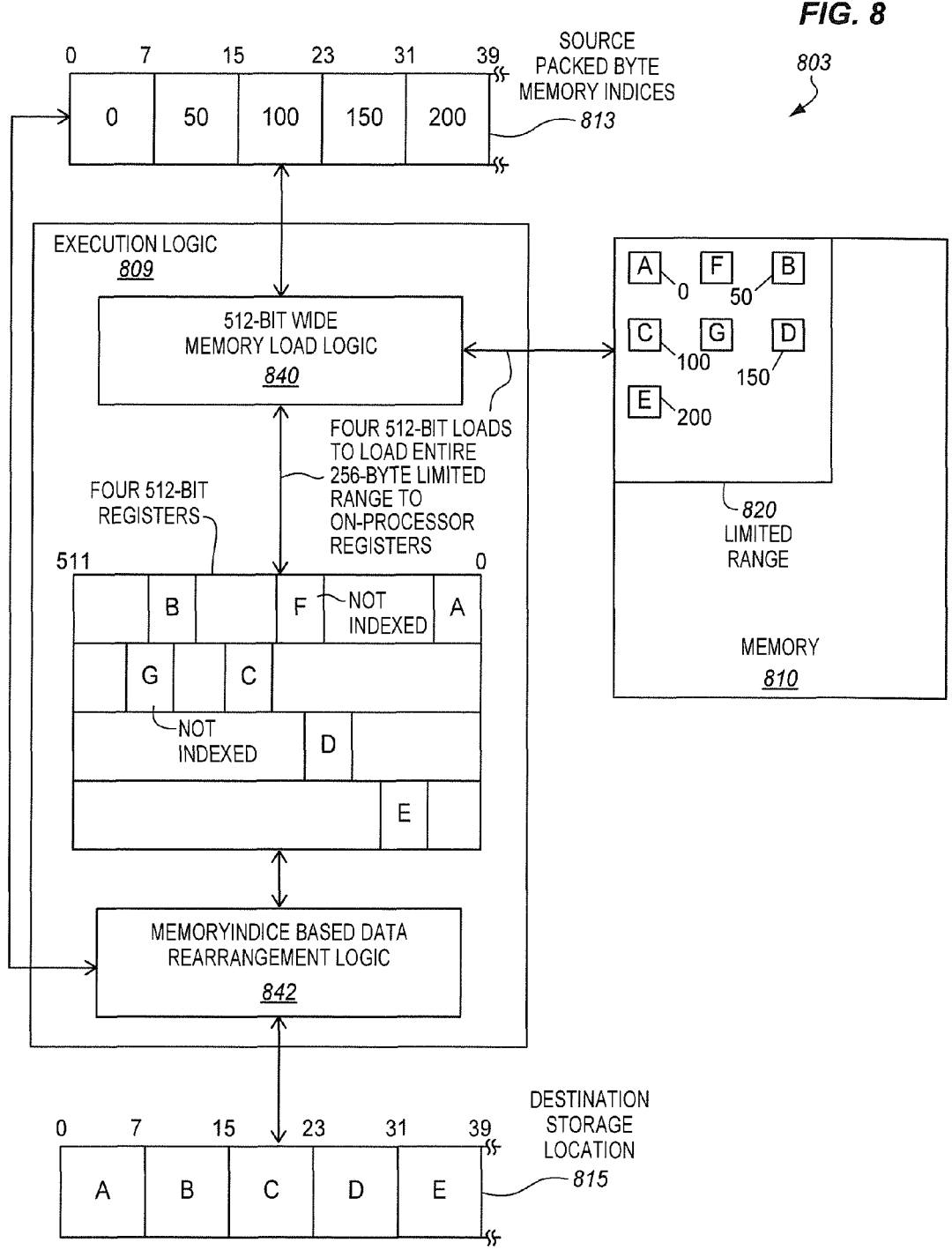
FIG. 8 is a block diagram of an example implementation embodiment of a limited range vector gather operation.

FIG. 8 is a block diagram of an example implementation of an embodiment of a limited range vector gather operation 803 that may be performed in response to an embodiment of a limited range gather instruction. In some embodiments, the operation 803 may be performed by and/or within the processor of FIG. 1 and/or the apparatus FIG. 2. Alternatively, the operation 803 may be performed by and/or within a similar or entirely different processor or apparatus. Moreover, the processor of FIG. 1 and/or the apparatus of FIG. 2 may perform operations similar to, or entirely different than, those of FIG. 8. Moreover, in some embodiments, aspects of the operation 803 may optionally be incorporated into the method of FIG. 3 which in embodiments may be performed by and/or within the processor of FIG. 1 and/or the apparatus FIG. 2.

The limited range gather instruction may specify or otherwise indicate a source packed memory indices 813 and a destination storage location 815. As shown, in some embodiments, the memory indices may be 8-bit byte memory indices, although this is not required. In the illustrated example, the memory indices have the values, from the least significant position (on the left) to the most significant position (on the right) right, 0, 50, 100, 150, 200. These values are only examples, although notice that all values are within the range of 0 to 255 capable of being indexed by byte indices.

An embodiment of execution logic 809 may perform the limited range vector gather operation 803. Similar to previously discussed embodiments, the operation may gather data elements that are indicated by the memory indices from within only a limited range 820 of a memory 810 and store the gathered data elements in corresponding result data elements in the destination storage location 815. As shown in the illustrated example, the memory indices 0, 50, 100, 150, 200 may indicate data elements with values A, B, C, D, E in the limited range, and these values A, B, C, D, E may be stored in the corresponding result data elements of the destination storage location. The limited range may have any of the optional attributes mentioned elsewhere herein.

One way to implement a vector gather instruction is to load or gather each data element separately or individually through a separate load operation (e.g., a microoperation). For example, eight load operations may be performed sequentially, one after the other, to gather eighth data elements. Such sequential load operations generally tend to take a significant amount of time to complete. Also, during these sequential load operations, page faults may potentially occur. Consequently, the processor generally needs to be able to track all of the load operations and monitor completion of the gather instructions in case such page faults do happen to occur.

However, in some embodiments, rather than loading or gathering single data elements, multiple data elements may be loaded or otherwise retrieved from the limited range of the memory onto the processor per load operation. That is, in some embodiments, the limited range vector gather operation may be implemented using one or more multiple data element loads. As shown in the illustrated example embodiment, the execution logic 809 may include 512-bit wide memory load logic 840 coupled with the limited range. The 512-bit wide memory load logic may perform 512-bit loads to load as many data elements as fit within the 512-bits in a single load operation. For example, a single 512-bit load operation may load sixty-four 8-bit byte data elements. In some embodiments, an entire 256-byte limited range 820 may be loaded into the processor using four 512-bit loads to respectively load four 512-bit non-overlapping portions of the 256-byte limited range. As shown, in some embodiments, the entire 256-bit loaded limited range may be stored in four 512-bit registers, or alternatively could be stored in eight 256-bit registers or two 1024-bit registers. Any on-processor storage locations are potentially suitable including dedicated or existing registers architectural or non-architectural. As another option, rather than 512-bit loads, narrower (e.g., 128-bit, 256-bit, etc.) or wider (e.g., 1024-bit) loads may optionally be used. Moreover, if no needed data elements are within a given portion of the limited range, one or more of these loads may optionally be omitted.

Each load may potentially, depending on the values of the memory indices, load both needed/desired and un-needed/un-desired data elements. For example, each load may load at least one data element at a memory address that is to be indicated by a memory index of the plurality and at least one data element at a memory address that is not to be indicated by a memory index of the plurality. For example, as shown in the illustration, the needed/desired data elements A, B, C, D, and E corresponding to the indices 0, 50, 100, 150, and 200, respectively, may be loaded. Additionally, un-needed/un-desired data elements, such as, for example, data elements F and G, may be loaded. Other un-needed/un-desired data elements (not shown for simplicity) may also be loaded. The data elements F and G may not be indexed or addressed by the source packed byte memory indices 813. Advantageously, such multi-data element loads may allow a given number of data elements to be gathered in less than that given number of loads. For example, typically more than four desired data elements may be included in the loaded limited range, even though only four load operations were performed. For example, in one embodiment, sixty-four 8-bit byte data elements may be gathered in only four loads. In other embodiments, thirty two, sixteen, or eight desired relatively smaller data elements may be loaded with a lesser number (e.g., four) larger multiple data element loads from memory. This in turn may help to increase the speed of the operation.

Referring again to the illustration, the execution logic 809 also includes memory-indices based data rearrangement logic 842. The memory-indices based data rearrangement logic may be operable to rearrange the desired/needed data elements from the loaded limited range and/or loaded data elements and store them in the appropriate positions in the destination storage location as indicated by the corresponding memory indices. In some embodiments, a subset of data elements of the entire limited range may be selectively moved to a destination storage location based on the memory indices. Various ways of performing the rearrangements are contemplated. In some embodiments, one or more permutes, shuffles, extracts, or other data rearrangement operations may be used.

Various different packed data widths and data element widths are suitable. In some embodiments, a 128-bit wide packed data may include sixteen 8-bit byte data elements, or eight 16-bit word data elements. In other embodiments, a 256-bit packed data may include thirty-two 8-bit byte data elements, or sixteen 16-bit word data elements. In still other embodiments, a 512-bit packed data may include sixty-four 8-bit byte data elements, or thirty-two 16-bit word data elements. In further embodiments, packed data formats either larger than 512-bits, or smaller than 128-bits, are also suitable. For example 1012-bit packed data, and 64-bit packed data, are suitable for either 8-bit bytes or 16-bit words. Generally, the number of data elements is equal to the size in bits of the packed data operand divided by the size in bits of the data elements.

Figure 9:
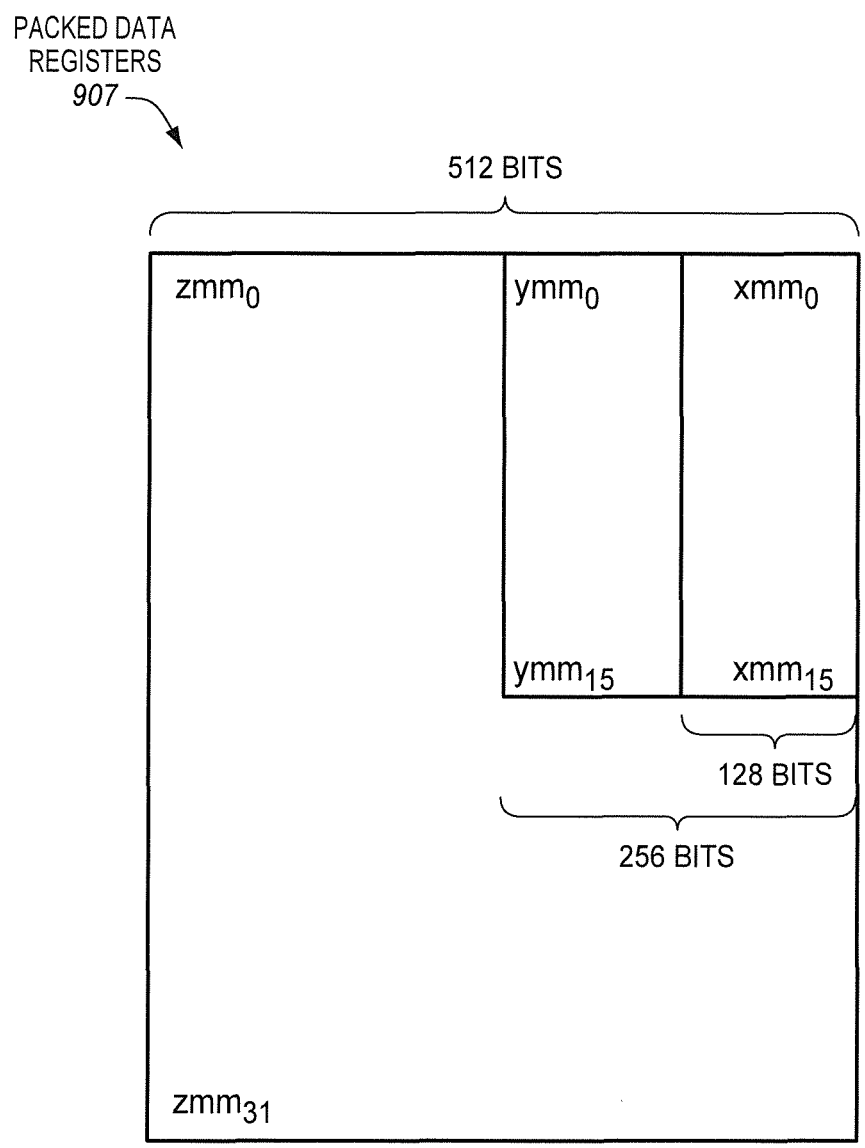
FIG. 9 is a block diagram of an example embodiment of a suitable set of packed data registers.

FIG. 9 is a block diagram of an example embodiment of a suitable set of packed data registers 907. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 10:
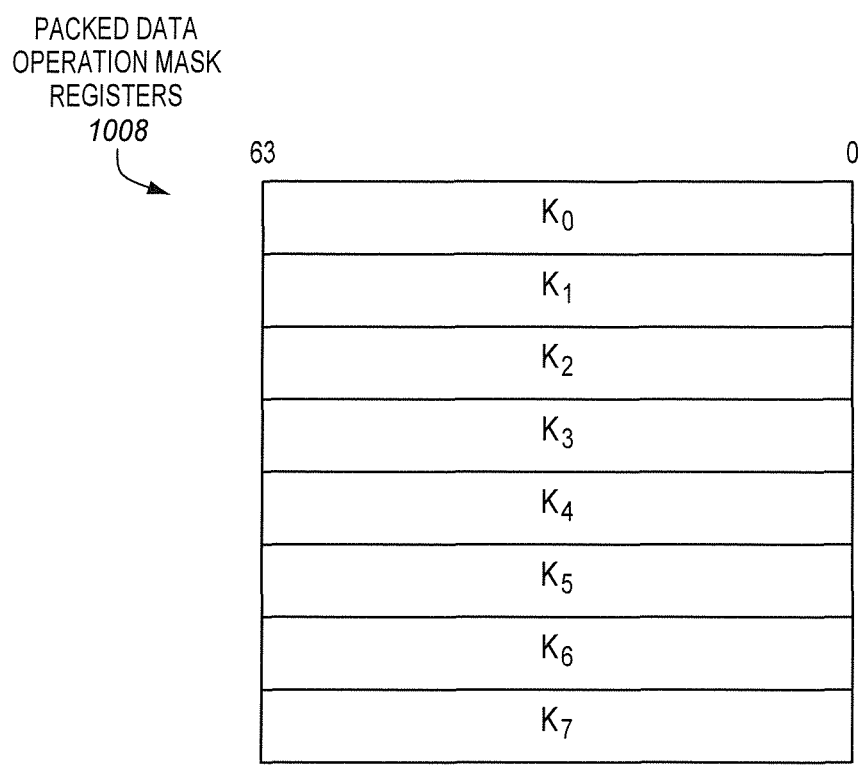
FIG. 10 is a block diagram of an example embodiment of a suitable set of packed data operation mask registers.

FIG. 10 is a block diagram of an example embodiment of a suitable set of packed data operation mask registers 1008. Each of the packed data operation mask registers may be used to store a packed data operation mask. In the illustrated embodiment, the set includes eight packed data operation mask registers labeled k0 through k7. Alternate embodiments may include either fewer than eight (e.g., two, four, six, etc.) or more than eight (e.g., sixteen, twenty, thirty-two, etc.) packed data operation mask registers. In the illustrated embodiment, each of the packed data operation mask registers is 64-bits. In alternate embodiments, the widths of the packed data operation mask registers may be either wider than 64-bits (e.g., 80-bits, 128-bits, etc.) or narrower than 64-bits (e.g., 8-bits, 16-bits, 32-bits, etc). By way of example, a masked limited range vector memory access instruction may use three bits (e.g., a 3-bit field) to encode or specify any one of the eight packed data operation mask registers k0 through k7. In alternate embodiments, either fewer or more bits may be used when there are fewer or more packed data operation mask registers, respectively.

Figure 11:
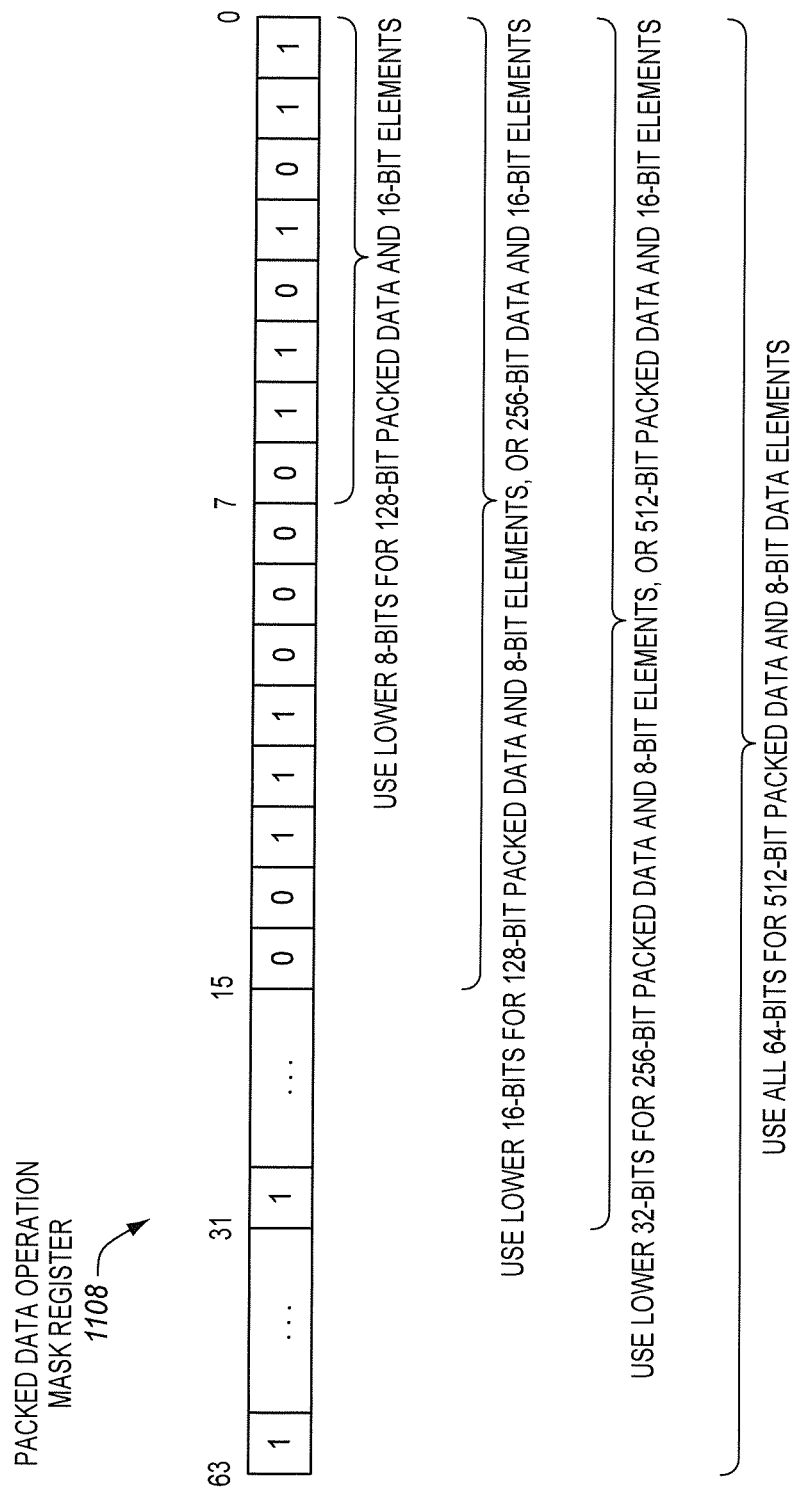
FIG. 11 is a diagram illustrating an example embodiment of a 64-bit packed data operation mask register in which the number of mask bits depends on the packed data width and the data element width.

FIG. 11 is a diagram illustrating an example embodiment of a 64-bit packed data operation mask register 1108 and illustrating that the number of bits used as a packed data operation mask and/or for masking depends upon the packed data width and the data element width. The illustrated mask register is 64-bits wide, although this is not required. Generally, when a single per-element masking control bit is used, the number of bits used for masking is equal to the packed data width in bits divided by the packed data element width in bits. To further illustrate, consider a few possible example embodiments. Only 8-bits, for example only the lower 8-bits, may be used for 128-bit packed data having 16-bit data elements. Only 16-bits, for example only the lower 16-bits, may be used either for 128-bit packed data having 8-bit data elements, or for 256-bit packed data having 16-bit data elements. Only 32-bits, for example only the lower 32-bits, may be used either for 256-bit packed data having 8-bit data elements, or for 512-bit packed data having 16-bit data elements. All 64-bits-bits may be used for 512-bit packed data having 8-bit data elements.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 12A illustrates an exemplary AVX instruction format including a VEX prefix 1202, real opcode field 1230, Mod R/M byte 1240, SIB byte 1250, displacement field 1262, and IMM8 1272. FIG. 12B illustrates which fields from FIG. 12A make up a full opcode field 1274 and a base operation field 1242. FIG. 12C illustrates which fields from FIG. 12A make up a register index field 1244.

VEX Prefix (Bytes 0-2) 1202 is encoded in a three-byte form. The first byte is the Format Field 1240 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1215 (VEX byte 1, bits [4:0]-mmmmm) includes content to encode an implied leading opcode byte. W Field 1264 (VEX byte 2, bit [7]-W)—is represented by the notation VEX.W, and provides different functions depending on the instruction. The role of VEX.vvvv 1220 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 1268 Size field (VEX byte 2, bit [2]-L)=0, it indicates 128 bit vector; if VEX.L=1, it indicates 256 bit vector. Prefix encoding field 1225 (VEX byte 2, bits [1:0]-pp) provides additional bits for the base operation field.

Real Opcode Field 1230 (Byte 3) is also known as the opcode byte. Part of the opcode is specified in this field.

MOD R/M Field 1240 (Byte 4) includes MOD field 1242 (bits [7-6]), Reg field 1244 (bits [5-3]), and R/M field 1246 (bits [2-0]). The role of Reg field 1244 may include the following: encoding either the destination register operand or a source register operand (the rrr of Rrrr), or be treated as an opcode extension and not used to encode any instruction operand. The role of R/M field 1246 may include the following: encoding the instruction operand that references a memory address, or encoding either the destination register operand or a source register operand.

Scale, Index, Base (SIB)—The content of Scale field 1250 (Byte 5) includes SS1252 (bits [7-6]), which is used for memory address generation. The contents of SIB.xxx 1254

(bits [5-3]) and SIB.bbb 1256 (bits [2-0]) have been previously referred to with regard to the register indexes Xxxx and Bbbb.

The Displacement Field 1262 and the immediate field (IMM8) 1272 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
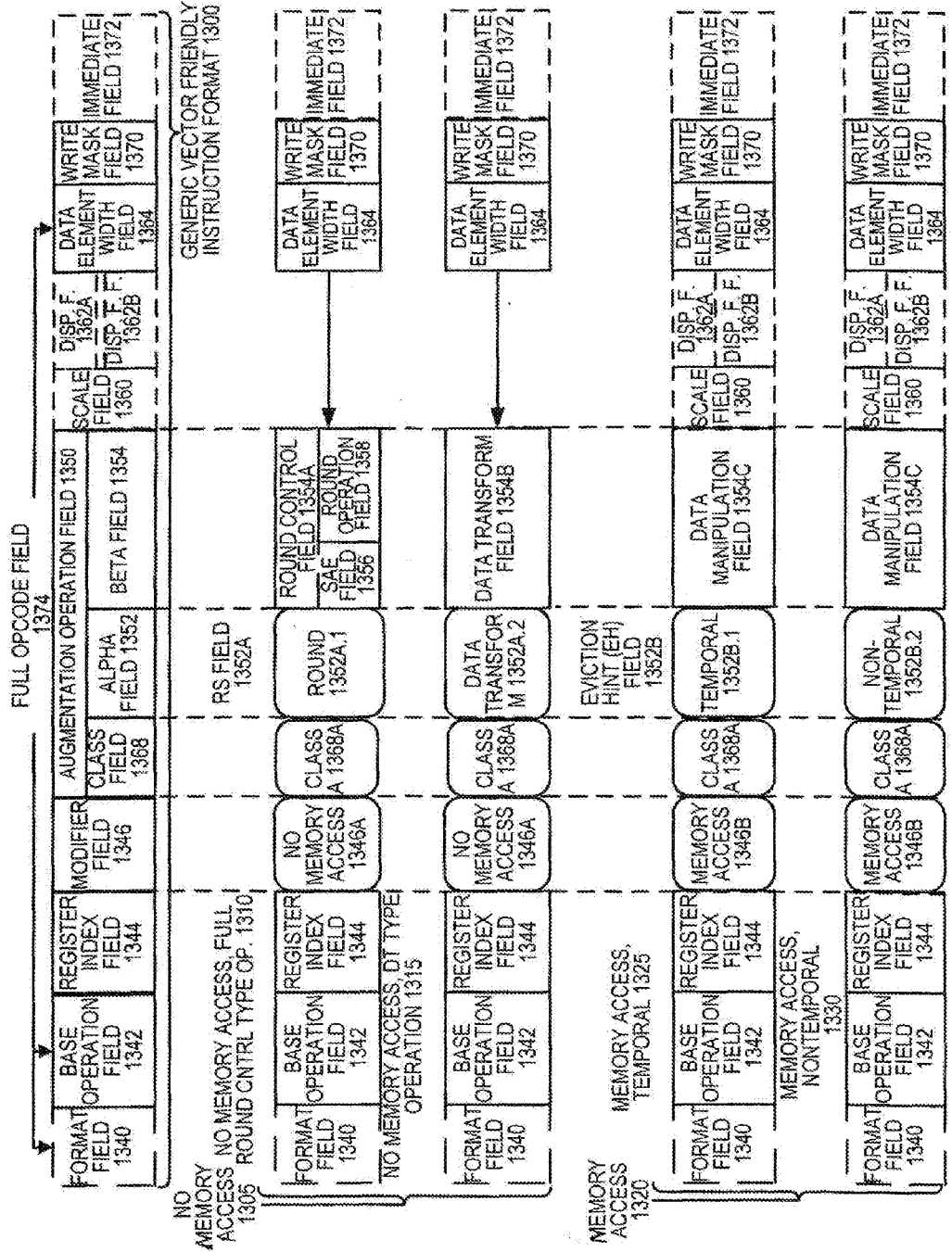
FIG. 13A is a block diagram illustrating a generic vector friendly instruction format and class A instruction templates thereof according to embodiments of the invention.
Figure 13B:
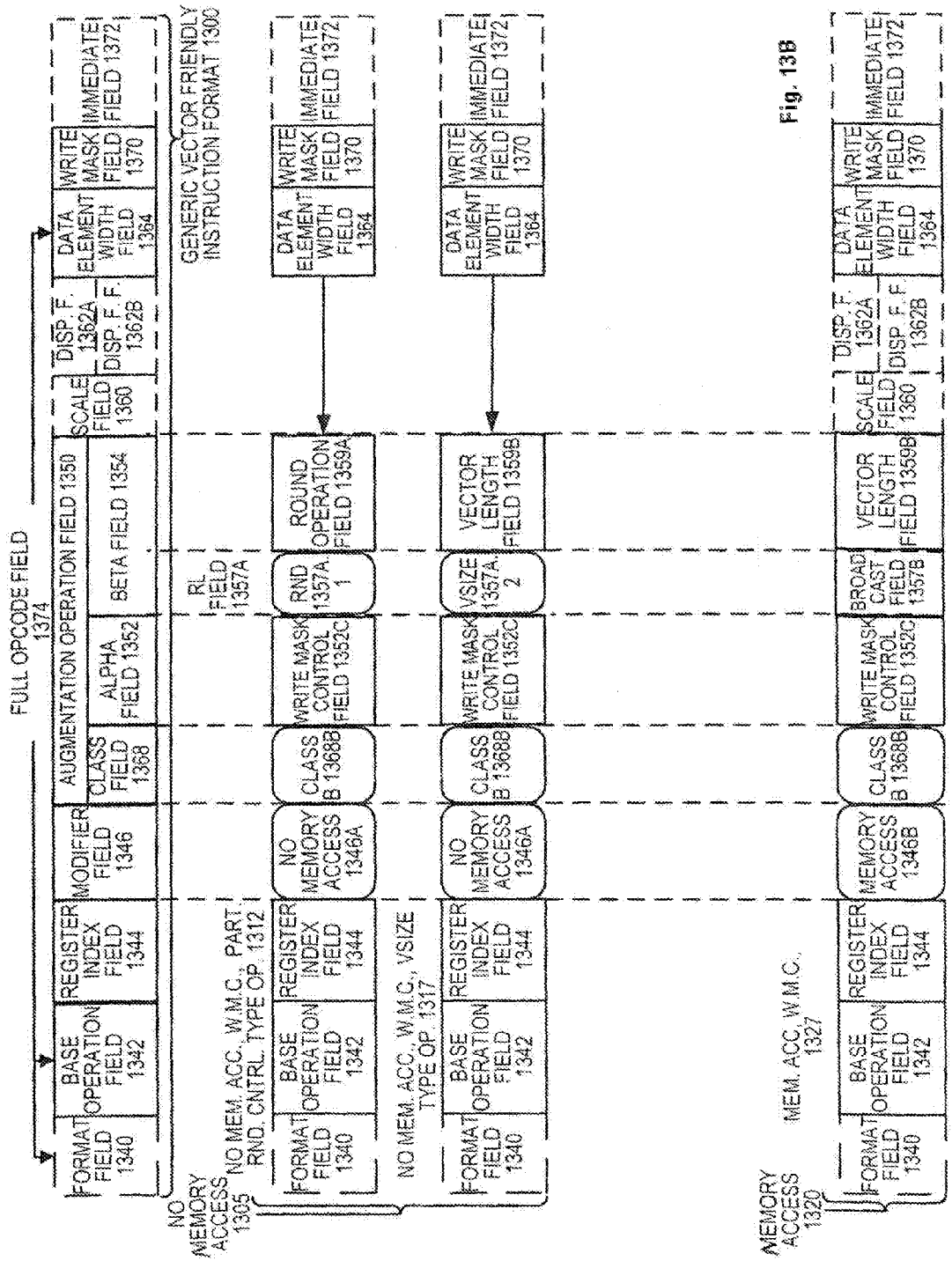
FIG. 13B is a block diagram illustrating the generic vector friendly instruction format and class B instruction templates thereof according to embodiments of the invention.

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*index+base$).

Displacement Field 1362A—its content is used as part of memory address generation (e.g., for address generation that uses $2^{scale}*index+base+displacement$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access

1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14A is a block diagram illustrating an exemplary specific vector friendly instruction format according to embodiments of the invention. FIG. 14A shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 13 into which the fields from FIG. 14A map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]-R), EVEX.X bit field (EVEX byte 1, bit [6]-X), and 1357BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or OF 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (is complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.0=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
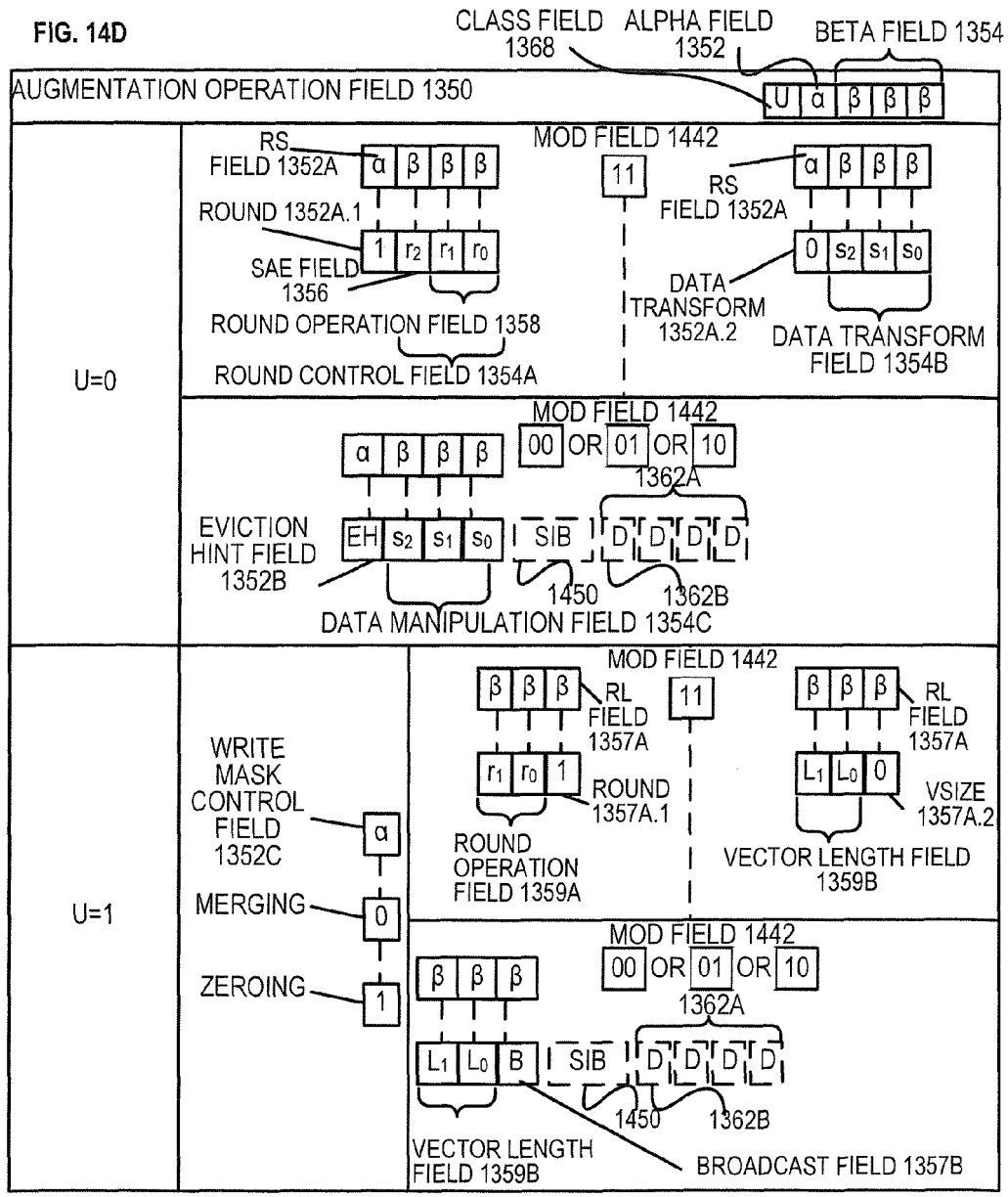
FIG. 14D is a block diagram illustrating the fields of the specific vector friendly instruction format that make up the augmentation operation field according to one embodiment of the invention.

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 17B:
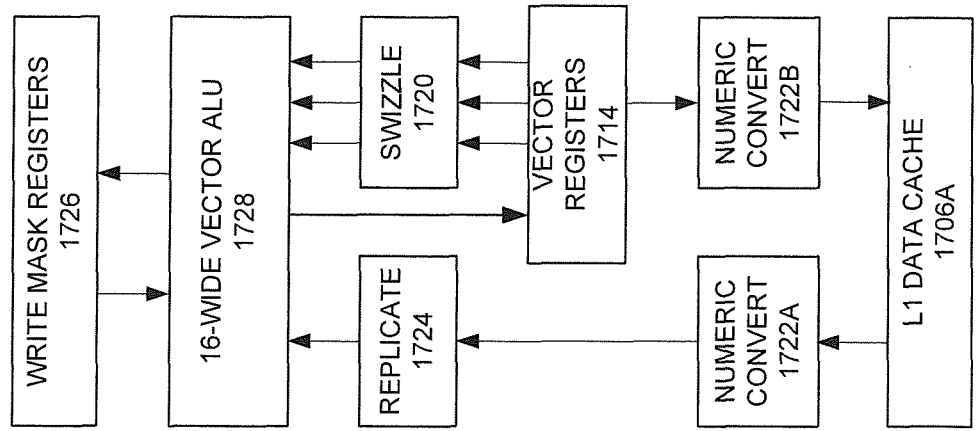
FIG. 17B is an expanded view of part of the processor core in FIG. 17A according to embodiments of the invention.
Figure 17A:
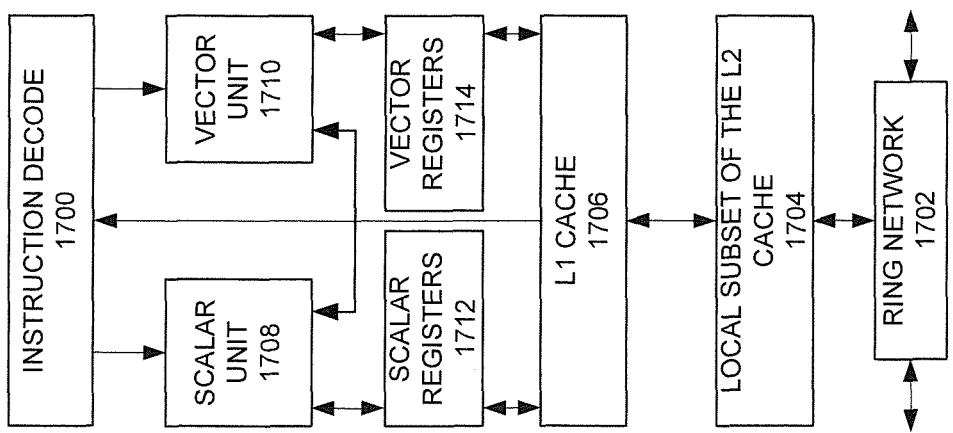
FIG. 17A is a block diagram of a single processor core, along with its connection to the on-die interconnect network and with its local subset of the Level 2 (L2) cache, according to embodiments of the invention.

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Processor with Integrated Memory Controller and Graphics

Figure 18:
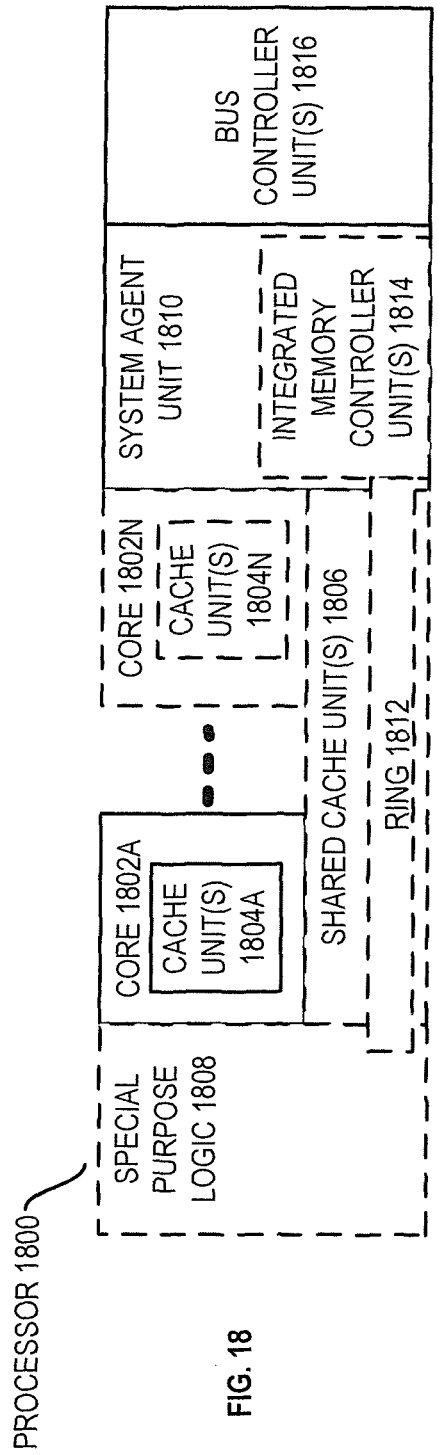
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multithreading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
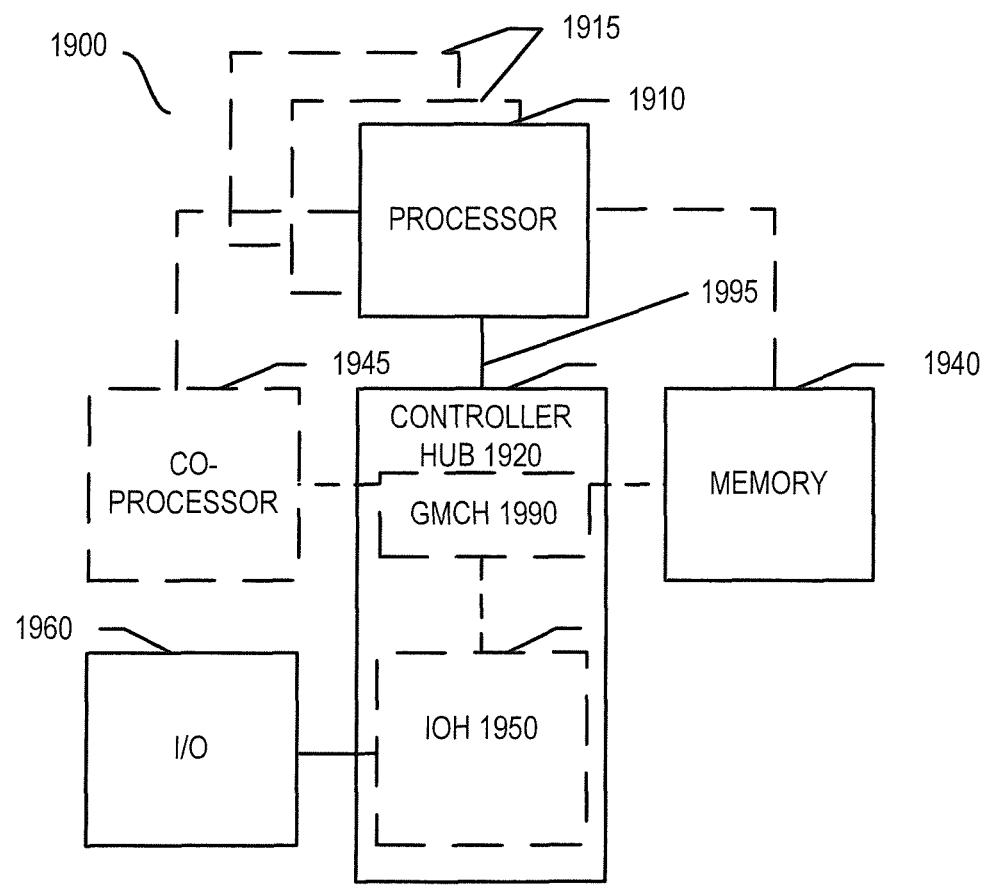
FIG. 19 shown is a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
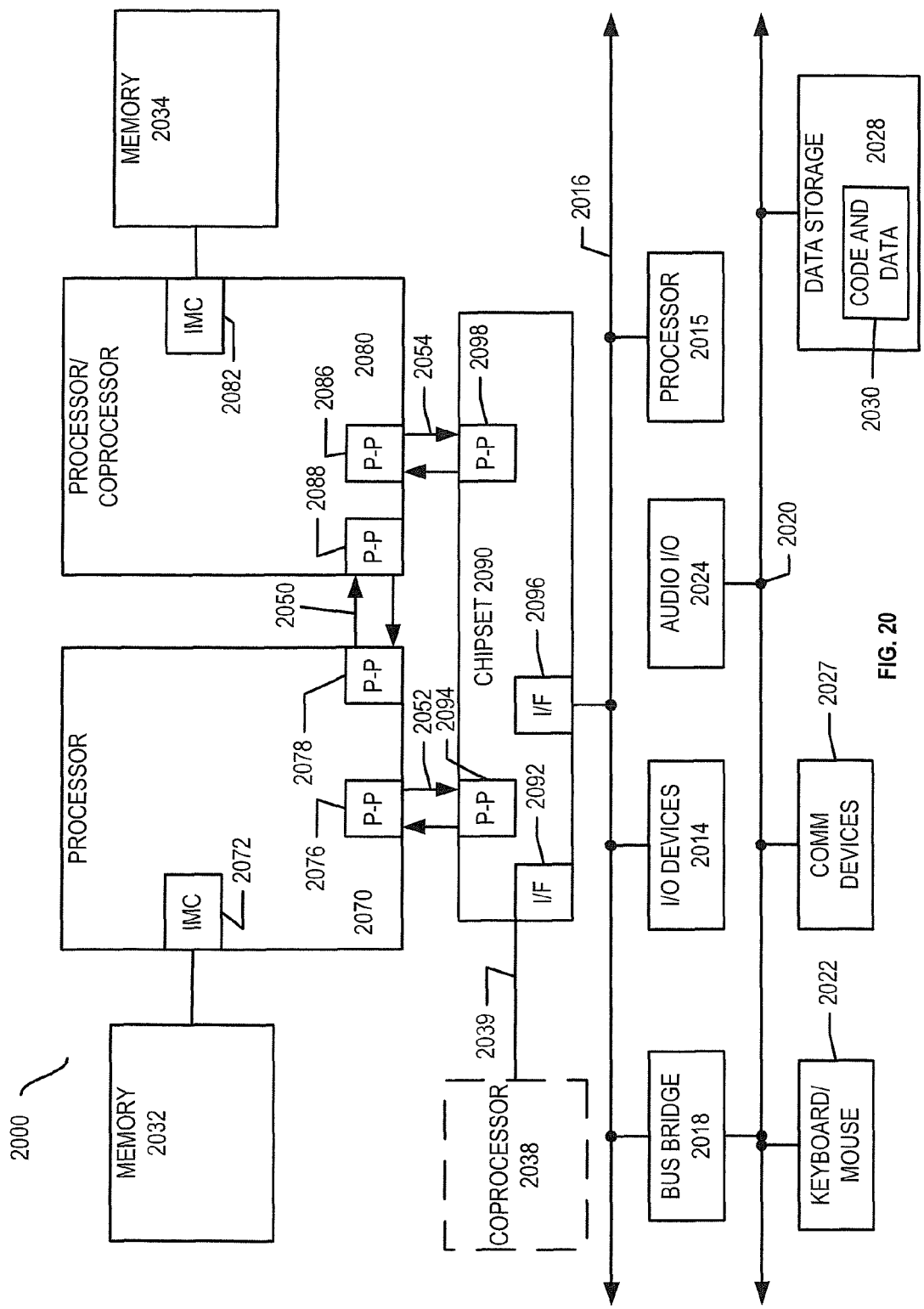
FIG. 20 shown is a block diagram of a first more specific exemplary system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
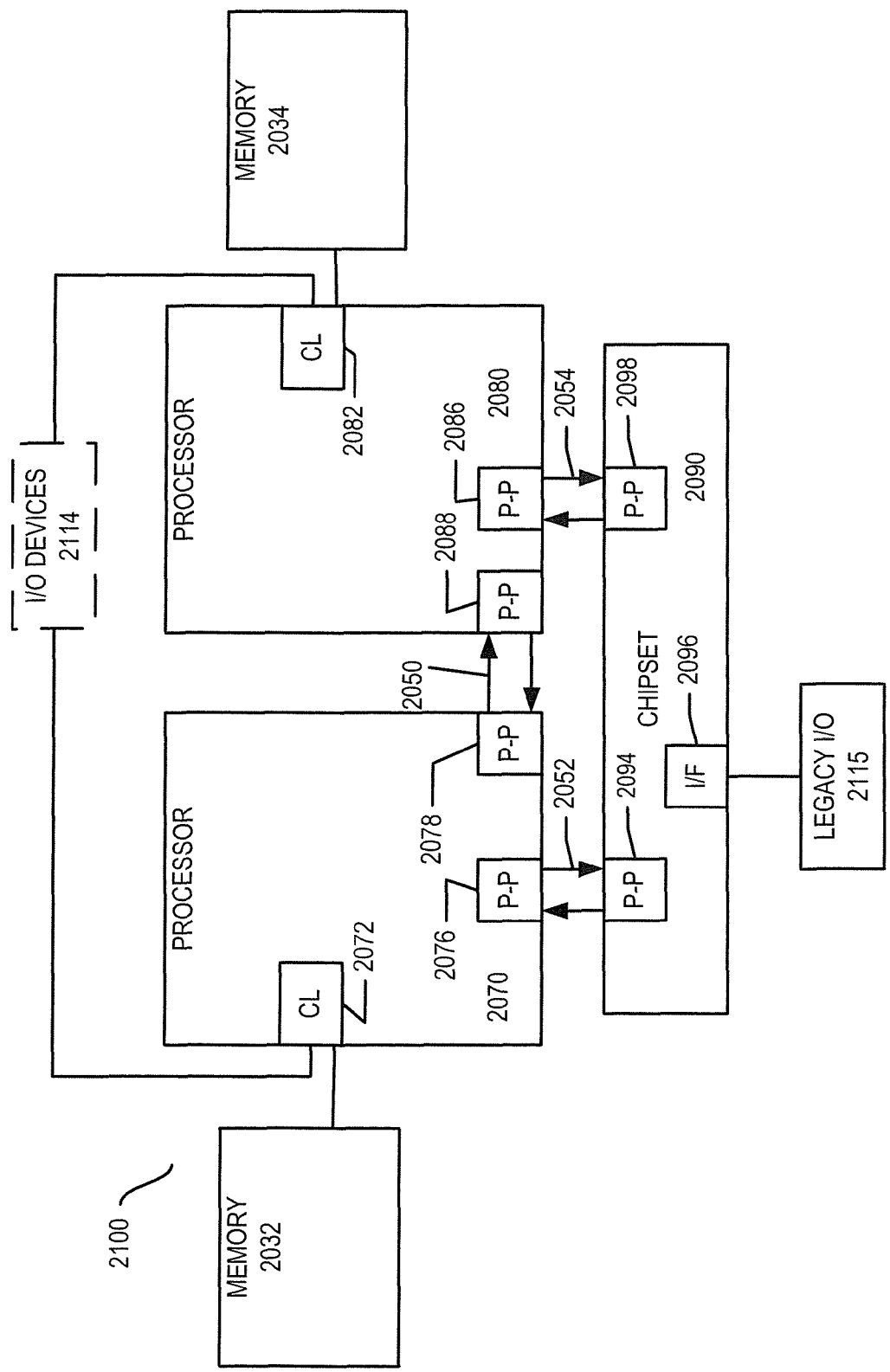
FIG. 21 shown is a block diagram of a second more specific exemplary system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
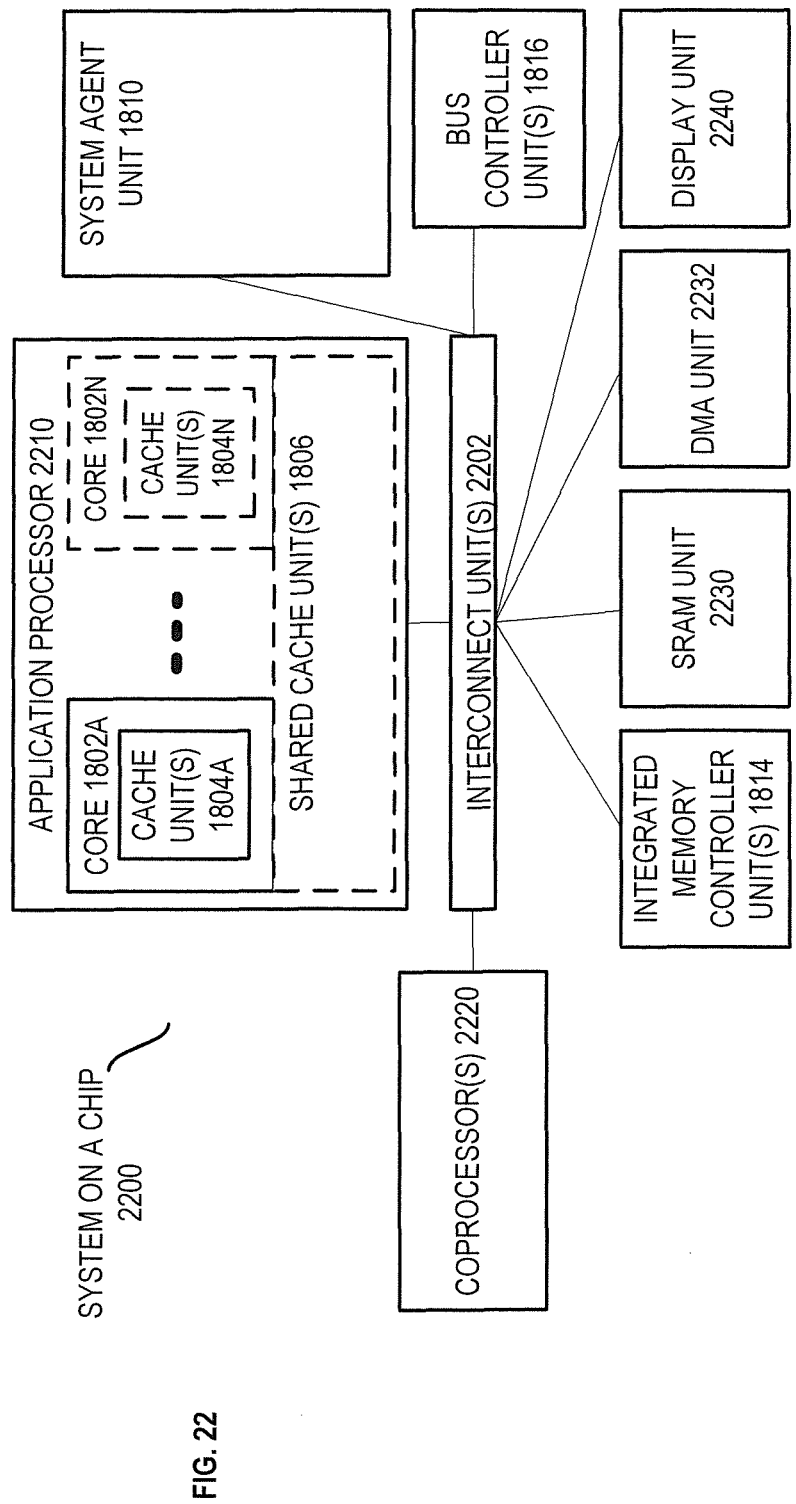
FIG. 22 shown is a block diagram of a SoC in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Components, features, and details described for any of FIGS. 4-11 may also optionally be used in any of FIGS. 1-3. Moreover, components, features, and details described herein for any of the apparatus may also optionally be used in any of the methods described herein, which in embodiments may be performed by and/or with such the apparatus.

EXAMPLE EMBODIMENTS

The following examples pertain to further embodiments. Specifics in the examples may be used anywhere in one or more embodiments.

Example 1 is a processor. The processor includes a plurality of packed data registers. The processor also includes a unit coupled with the packed data registers, the unit operable, in response to a limited range vector memory access instruction that is to indicate a source packed memory indices that is to have a plurality of packed memory indices selected from 8-bit memory indices and 16-bit memory indices, to access memory locations, in only a limited range of a memory, in response to the limited range vector memory access instruction.

Example 2 includes the subject matter of claim 1 and optionally wherein the limited range vector memory access instruction is to indicate the source packed memory indices that is to include 8-bit memory indices.

Example 3 includes the subject matter of claim 1 and optionally wherein the unit, in response to the limited range vector memory access instruction, is to access memory locations in the limited range that is to comprise only 256 bytes.

Example 4 includes the subject matter of claim 1 and optionally wherein the limited range vector memory access instruction is to indicate the source packed memory indices that is to include at least 32 memory indices.

Example 5 includes the subject matter of claim 1 and optionally wherein the unit, in response to the limited range vector memory access instruction, is to access the limited range of the memory with a memory address of at least 32-bits.

Example 6 includes the subject matter of claim 5 and optionally wherein the unit, in response to the limited range vector memory access instruction, is to sign extend each of the memory indices, and apply a scale factor to each of the sign extended memory indices.

Example 7 includes the subject matter of claim 1 and optionally wherein the unit, in response to the limited range vector memory access instruction, is to perform a multiple data element load that is to load at least one data element at a memory address that is to be indicated by a memory index of the plurality and at least one data element at a memory address that is not to be indicated by a memory index of the plurality.

Example 8 includes the subject matter of claim 1 and optionally wherein the unit, in response to the limited range vector memory access instruction, is to load the entire limited range from the memory to storage locations of the processor.

Example 9 includes the subject matter of claim 1 and optionally wherein the unit, in response to the limited range vector memory access instruction, is to perform a multiple data element load that is to load a plurality of data elements, and store a first of the plurality of loaded data elements in a destination storage location that is to be indicated by the instruction without storing a second of the loaded data elements in the destination storage location when one of: (a) the instruction does not indicate a packed data operation mask; and (b) the instruction indicates a packed data operation mask but a corresponding mask element of the packed data operation mask is to be unmasked.

Example 10 includes the subject matter of claim 1 and optionally wherein the unit, in response to the limited range vector memory access instruction, is to load the entire limited range from the memory to storage locations of the processor, and wherein the unit, in response to the limited range vector memory access instruction, is to selectively move a subset of data elements of the entire limited range to a destination storage location that is to be indicated by the instruction based on the memory indices.

Example 11 includes the subject matter of any of claims 1-8 and optionally wherein the limited range vector memory access instruction is to indicate a destination storage location, and wherein the unit, in response to the limited range vector memory access instruction, is to store a packed data result in the destination storage location, the packed data result to have a plurality of data elements each from a memory location in the limited range that is to be indicated by a corresponding memory index.

Example 12 includes the subject matter of any of claims 1-8 and optionally wherein the limited range vector memory access instruction is to indicate a source packed data having a plurality of data elements, and wherein the unit, in response to the limited range vector memory access instruction, is to write each data element of the source packed data to a memory location in the limited range that is to be indicated by a corresponding memory index.

Example 13 includes the subject matter of any of claims 1-8 and optionally wherein the limited range vector memory access instruction is to indicate a packed data operation mask.

Example 14 is a method in a processor. The method includes receiving a limited range vector memory access instruction, the limited range vector memory access instruction indicating a source packed memory indices having a plurality of packed memory indices selected from 8-bit memory indices and 16-bit memory indices. The method also includes accessing memory locations, in only a limited range of a memory, in response to the limited range vector memory access instruction.

Example 15 includes the subject matter of claim 14 and optionally wherein receiving comprises receiving the instruction that indicates the source packed memory indices, which includes 8-bit memory indices.

Example 16 includes the subject matter of claim 14 and optionally wherein accessing comprises accessing memory locations in the limited range, which consists of 256 bytes.

Example 17 includes the subject matter of claim 14 and optionally wherein receiving comprises receiving the instruction indicating a destination storage location, and further comprising storing a packed data result in the destination storage location in response to the instruction, the packed data result having a plurality of data elements each from a memory location in the limited range that is indicated by a corresponding memory index.

Example 18 includes the subject matter of claim 14 and optionally wherein receiving comprises receiving the instruction indicating a source packed data having a plurality of data elements, and wherein accessing comprises writing each data element of the source packed data to a memory location in the limited range that is indicated by a corresponding memory index, in response to the instruction.

Example 19 includes the subject matter of claim 14 and optionally wherein accessing comprises accessing with at least 32-bit memory addresses.

Example 20 includes the subject matter of claim 14 and optionally wherein accessing comprises performing a multiple data element load including loading at least one data element at a memory address that is indicated by a memory index of the plurality and at least one data element at a memory address that is not indicated by a memory index of the plurality.

Example 21 includes the subject matter of claim 14 and optionally further includes performing a multiple data element load to load a plurality of data elements and storing a first of the loaded data elements in a destination storage location indicated by the instruction without storing a second of the loaded data elements in the destination storage location when one of: (a) the instruction does not use a packed data operation mask; and (b) the instruction uses a packed data operation mask but a corresponding mask element of the packed data operation mask is unmasked.

Example 22 is a system to process instructions. The system includes an interconnect. The system also includes a processor coupled with the interconnect. The system also includes a dynamic random access memory (DRAM) coupled with the interconnect, the DRAM storing a limited range vector memory access instruction, the limited range vector memory access instruction to indicate a source packed memory indices having a plurality of packed memory indices selected from 8-bit memory indices and 16-bit memory indices, the limited range vector memory access instruction, if executed by the processor, operable to cause the processor to perform operations comprising access memory locations, in only a limited range of a memory.

Example 23 includes the subject matter of Example 22 and optionally wherein the limited range vector memory access instruction is to indicate the source packed memory indices that is to include 8-bit memory indices, wherein the instruction, if executed by the processor, is to be operable to cause the processor to access the limited range with a memory address of at least 32-bits.

Example 24 is an article of manufacture comprising a non-transitory machine-readable storage medium, the non-transitory machine-readable storage medium storing a limited range vector memory access instruction, the limited range vector memory access instruction indicating a source packed memory indices having a plurality of packed memory indices selected from 8-bit memory indices and 16-bit memory indices, and the limited range vector memory access instruction if executed by a machine operable to cause the machine to perform operations comprising accessing memory locations, in only a limited range of a memory.

Example 25 includes the subject matter Example 24 an optionally wherein the limited range vector memory access instruction is to indicate the source packed memory indices that is to include 8-bit memory indices, and wherein the source packed memory indices that is to include at least 32 memory indices.

Example 26 is an apparatus to perform the method of any of Examples 14-21.

Example 27 is an apparatus comprising means for performing the method of any of Examples 14-21.

Example 28 is a machine-readable storage medium storing an instruction that if executed by a machine are to cause the machine to perform the method of any of Examples 14-21.

Example 29 is a processor to execute an instruction substantially as described herein.

Example 30 is a processor to perform a method substantially as described herein.

Example 31 is a processor comprising means for performing a method substantially as described herein.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decode logic through one or more intervening components. In the figures, arrows are used to show connections and couplings.

In the description and claims, the term "logic" may have been used. As used herein, logic may include a module such as hardware, firmware, software, or various combinations thereof. Examples of logic include integrated circuitry, application specific integrated circuits, analog circuits, digital circuits, programmed logic devices, memory devices including instructions, etc. In some embodiments, hardware logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where multiple components have been shown and described, in some cases these multiple components may be incorporated into one component. Where a single component has been shown and described, in some cases this single component may be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In another embodiment, the machine-readable medium may include a transitory machine-readable communication medium, for example, the electrical, optical, acoustical or other forms of propagated signals, such as carrier waves, infrared signals, digital signals, or the like.

Examples of suitable machines include, but are not limited to, general-purpose processors, special-purpose processors, instruction processing apparatus, digital logic circuits, integrated circuits, and the like. Still other examples of suitable machines include computing devices and other electronic devices that incorporate such processors, instruction processing apparatus, digital logic circuits, or integrated circuits. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
a plurality of packed data registers;
a decode unit to decode an instruction that is to indicate a source packed data register of the plurality of packed data registers that is to have at least four packed memory indices, which are each to have no more than 16-bits, and the instruction to indicate a destination packed data register of the plurality of packed data registers; and
an execution unit coupled with the decode unit and coupled with the packed data registers, the execution unit operable, in response to the instruction, to store a packed data result in the destination packed data register, the packed data result to have at least four data elements that are each to have been loaded from a memory location, in only a limited range of a memory, that is to have been indicated by a different corresponding one of the at least four packed memory indices.

2. The processor of claim 1, wherein the decode unit is to decode the instruction that is to indicate the source packed data register that is to have at least four 8-bit packed memory indices.

3. The processor of claim 1, wherein the execution unit, in response to the instruction, is to load each of the at least four data elements from the limited range in the memory that is to comprise only 256 bytes.

4. The processor of claim 1, wherein the decode unit is to decode the instruction that is to indicate the source packed data register that is to have at least thirty two packed memory indices.

5. The processor of claim 1, wherein the execution unit, in response to the instruction, is to load each of the at least four data elements from the limited range in the memory with a memory address of at least 32-bits.

6. The processor of claim 5, wherein the execution unit, in response to the instruction, is to:
sign extend each of the memory indices; and
apply a scale factor to each of the sign extended memory indices.

7. The processor of claim 1, wherein the execution unit, in response to the instruction, is to perform a multiple data element load that is to load at least one data element at a memory location that is to be indicated by a corresponding one of the packed memory indices and at least one other data element at a memory location that is not to be separately indicated by different corresponding one of the packed memory indices.

8. The processor of claim 1, wherein the execution unit, in response to the instruction, is to load the entire limited range of the memory to storage locations of the processor.

9. The processor of claim 1, wherein the execution unit, in response to the instruction, is to:
perform a multiple data element load that is to load a plurality of data elements;
store a first of the plurality of loaded data elements in the destination packed data register that is to be indicated by the instruction without storing a second of the loaded data elements in the destination packed data register when one of:
(a) the instruction does not indicate a packed data operation mask; and
(b) the instruction indicates a packed data operation mask but a corresponding mask element of the packed data operation mask is unmasked.

10. The processor of claim 1, wherein the execution unit, in response to the instruction, is to:
load the entire limited range of the memory to storage locations of the processor; and
selectively move a subset of the loaded data elements of the entire limited range of the memory to the destination packed data register based on the packed memory indices.

11. The processor of claim 1, wherein the decode unit is to decode the instruction which is also to indicate a packed data operation mask.

12. A processor comprising:
a plurality of packed data registers;
a decode unit to decode an instruction that is to indicate a source packed data register of the plurality of packed data registers that is to have at least four packed memory indices, which are each to have no more than 16-bits, the instruction to indicate a packed data operation mask that is to have at least four mask elements, and the instruction to indicate a destination packed data register of the plurality of packed data registers; and
an execution unit coupled with the decode unit and coupled with the packed data registers, the execution unit operable, in response to the instruction, to store a packed data result in the destination packed data register, the packed data result to have a plurality of data elements that are each to correspond to a different one of the at least four mask elements of the packed data operation mask, each data elements of the packed data result that does not correspond to a masked out mask element of the packed data operation mask to have been loaded from a memory location, in only a limited range of a memory, with a memory address of at least 32-bits that is to be associated with a corresponding one of the at least four packed memory indices.

13. The processor of claim 12, wherein the execution unit, in response to the instruction, is to:
sign extend each of the memory indices; and
apply a scale factor to each of the sign extended memory indices.

14. The processor of claim 12, wherein the decode unit is to decode the instruction that is to indicate the source packed data register that is to have at least four 8-bit packed memory indices.

15. The processor of claim 12, wherein the execution unit, in response to the instruction, is to load each of the at least four data elements from the limited range in the memory that is to comprise no more than 256 bytes.

16. The processor of claim 12, wherein the execution unit, in response to the instruction, is to perform a multiple data element load that is to load at least one data element at a memory location that is to be indicated by a corresponding one of the packed memory indices and at least one other data element at a memory location that is not to be separately indicated by different corresponding one of the packed memory indices.

17. The processor of claim 12, wherein the execution unit, in response to the instruction, is to load the entire limited range of the memory to storage locations of the processor.

18. The processor of claim 12, wherein the execution unit, in response to the instruction, is to:
perform a multiple data element load that is to load a plurality of data elements;
store a first of the plurality of loaded data elements in the destination packed data register that is to be indicated by the instruction without storing a second of the loaded data elements in the destination packed data register when one of:
(a) the instruction does not indicate a packed data operation mask; and
(b) the instruction indicates a packed data operation mask but a corresponding mask element of the packed data operation mask is unmasked.

19. A processor comprising:
a plurality of packed data registers;
a decode unit to decode an instruction that is to indicate a first source packed data register of the plurality of packed data registers that is to have at least four packed memory indices, which are each to have no more than 16-bits, and the instruction to indicate a second source packed data register of the plurality of packed data registers that is to have at least four data elements that are each to correspond to a different one of the at least four packed memory indices; and
an execution unit coupled with the decode unit and coupled with the packed data registers, the execution unit operable, in response to the instruction, to store each of the at least four data elements of the second source packed data register to a memory location, in only a limited range of a memory, that is to have been indicated by the corresponding memory index of the at least four packed memory indices.

20. The processor of claim 19, wherein the decode unit is to decode the instruction that is to indicate the first source packed data register that is to have at least four 8-bit packed memory indices.

21. The processor of claim 19, wherein the execution unit, in response to the instruction, is to store the at least four data elements of the second source packed data register to the memory locations in only the limited range of the memory that is to comprise only 256 bytes.

22. The processor of claim 19, wherein the decode unit is to decode the instruction that is to indicate the first source packed data register that is to have at least thirty two packed memory indices.

23. The processor of claim 19, wherein the execution unit, in response to the instruction, is to store each of the at least four data elements of the second source packed data register to the memory location, in only the limited range of the memory, with a memory address of at least 32-bits.

24. The processor of claim 23, wherein the execution unit, in response to the instruction, is to:
sign extend each of the memory indices; and
apply a scale factor to each of the sign extended memory indices.

25. The processor of claim 19, wherein the decode unit is to decode the instruction which is also to indicate a packed data operation mask.

* * * * *